US010509102B2

(12) United States Patent
Grandin et al.

(10) Patent No.: US 10,509,102 B2
(45) Date of Patent: Dec. 17, 2019

(54) METHOD FOR NON-SUPERVISED DEINTERLEAVING BY N-DIMENSIONAL ENRICHMENT

(71) Applicant: THALES, Courbevoie (FR)

(72) Inventors: Jean-François Grandin, Elancourt (FR); Jean-Marie Lemoine, Elancourt (FR)

(73) Assignee: THALES, Courbevoie (FR)

( * ) Notice: Subject to any disclaimer, the term of this patent is extended or adjusted under 35 U.S.C. 154(b) by 873 days.

(21) Appl. No.: 15/024,010

(22) PCT Filed: Sep. 25, 2014

(86) PCT No.: PCT/EP2014/070450
§ 371 (c)(1),
(2) Date: Mar. 22, 2016

(87) PCT Pub. No.: WO2015/044248
PCT Pub. Date: Apr. 2, 2015

(65) Prior Publication Data
US 2016/0209492 A1 Jul. 21, 2016

(30) Foreign Application Priority Data
Sep. 27, 2013 (FR) ...................................... 13 02250

(51) Int. Cl.
*G01S 7/02* (2006.01)
*H04B 1/7163* (2011.01)
*G01S 7/00* (2006.01)

(52) U.S. Cl.
CPC ............ *G01S 7/021* (2013.01); *H04B 1/7163* (2013.01)

(58) Field of Classification Search
CPC .............................. G01S 7/021; H04B 1/7163
See application file for complete search history.

(56) References Cited

U.S. PATENT DOCUMENTS

| | | | | |
|---|---|---|---|---|
| 4,516,220 A * | 5/1985 | Baumann | G01S 7/021 | 708/212 |
| 4,918,455 A * | 4/1990 | Maier | G01S 7/021 | 342/13 |
| 5,063,385 A * | 11/1991 | Caschera | G01S 7/021 | 342/13 |
| 6,985,102 B1 * | 1/2006 | Horn | G01S 7/021 | 342/13 |
| 7,034,738 B1 * | 4/2006 | Wang | G01S 7/021 | 342/13 |
| 7,184,493 B1 * | 2/2007 | Pringle | G01S 7/021 | 342/111 |
| 7,397,415 B1 | 7/2008 | Wang et al. | | |
| 7,830,297 B1 * | 11/2010 | Wang | G01S 7/021 | 342/13 |
| 2013/0157599 A1 | 6/2013 | Ray et al. | | |

OTHER PUBLICATIONS

H. K. Mardia, "New Techniques for the Deinterleaving of Repetitive Sequences"; IEE Proceedings; vol. 136, Part F, No. 4; Aug. 1989; pp. 149-154. (Year: 1989).*
D. J. Milojevic et al., "Improved Algorithm for the Deinterleaving of Radar Pulses"; IEE Proceedings; vol. 139, part F, No. 1; Feb. 1992; pp. 98-104. (Year: 1992).*

* cited by examiner

*Primary Examiner* — Bernarr E Gregory
(74) *Attorney, Agent, or Firm* — Baker & Hostetler LLP

(57) ABSTRACT

A method of non-supervised deinterleaving of pulse trains comprises at least one N-dimensional enrichment step, N being an integer greater than 1.

4 Claims, 5 Drawing Sheets

METHOD FOR NON-SUPERVISED DEINTERLEAVING BY N-DIMENSIONAL ENRICHMENT

CROSS-REFERENCE TO RELATED APPLICATIONS

This application is a National Stage of International patent application PCT/EP2014/070450, filed on Sep. 25, 2014, which claims priority to foreign French patent application No. FR 1302250, filed on Sep. 27, 2013, the disclosures of which are incorporated by reference in their entirety.

The present invention relates to the field of signal radar receiving systems for ESM or ELINT (the initials standing for Electronic Support Measures and ELectronic INTElligence respectively) purpose, and more particularly the field of signal processing utilized by such a system. The present invention relates more particularly to a method of non-supervised deinterleaving by N-dimensional enrichment.

BACKGROUND

The processing considered is that of the non-supervised deinterleaving of the pulse trains emitted by electromagnetic emitters. With reference to FIG. 1, when an ESM or ELINT sensor, intercepts these pulse trains, it processes all the pulses whose power is greater than its sensitivity threshold. The emissions being present simultaneously, these pulse trains are nested or "interleaved".

These situations of mixing or interleaving of pulse trains are all the more frequent the more the sensitivity of the ESM sensors increases, bringing about an increase in the density of the detected pulses, and the more the agile emissions spread their pulses over the spectrum, thereby increasing the probability of finding pulses of several radars at a given frequency.

To process these situations the extractor must first of all isolate each emission of interest so as thereafter to be able to analyze it and characterize it. One speaks of "Deinterleaving".

The intercepted radar emissions are broadly of three types:

- TE1: This corresponds to emissions of High and Medium Recurrence frequency (HRF/MRF) exhibiting volumes of 30000 to more than 100000 pulses per second per emission. These emissions are of simple characteristics, that is to say of Pulse Repetition Interval (PRI) and/or stable Frequency per train. They are generally processed by fast and robust ad hoc schemes.
- TE2: This class corresponds to the Low Recurrence Frequency (LRF) emissions exhibiting volumes of 1000 pulses per second per emission. These emissions can exhibit complex characteristics such as for example a variable repetition period (or "stagger" as it is also known) of high order or pulse to pulse frequency agility.
- TE3: This type of emission refers to the LRF emissions with pulse to pulse agility of PRI and of frequency. Or emissions with Low Probability of Intercept (LPI) with low number of pulses and heavily modulated. Diverse processing schemes are usable such as for example, recognition on the intrapulse parameters and DOA or sorting by Direction Of Arrival (DOA) and location.

Subsequently, we will be concerned with the deinterleaving of emissions of type TE2 and TE3. Emissions of type TE1 are processed separately by fast algorithms.

Two complementary deinterleaving functions are distinguished:

- Supervised Deinterleaving (SD), in which the known characteristics of the signals such as for example, the Frequencies (F), the values of PRI, the Pulse Durations (PD) or the IntraPulse (IP) parameters, are used to recognize the pulses originating from these signals.
- Non Supervised Deinterleaving (NSD), in which one has no knowledge of these characteristics.

In most ESM or ELINT extractors these two functions cooperate as illustrated in FIG. 2.

The NSD schemes can be segmented between:

- Those which use classifications (or clustering) on primary parameters of the pulse (DOA, F, PD, IP)
- Those which use classifications on the basis of the Times of Arrival of the pulses (TOA) corresponding to the secondary parameter PRI.

In most extractors the two schemes are used in succession such as for example according to the diagram of FIG. 3.

Moreover in these extractors the deinterleaving and the tracking are carried out gradually while not examining the entirety of the information simultaneously.

A large volume of data requires to be processed by an ESM or ELINT sensor with fast reaction times. In general the computational power required evolves more rapidly than the evolution in the power of processors (Moore's law) on account of the increase in the amount of data to be processed and of the hitherto nonlinear complexity of the processing. In a nonlimiting manner, the following reasons may explain the drastic increase in data volumes:

- ELINT sensors have ever higher sensitivities for the detection of certain radars.

Emissions are agile, and thus, for maximum sensing of the waveform, it is necessary:

- to have sizable reception bands,
- to have long listening times.

The increase in the temporal density of the pulses also introduces effects of superposition of simultaneous pulses implying the loss of part of the pulses of a waveform.

The channelisation of certain receivers makes it necessary to scan the useful reception band, allowing only partial acquisition of the waveform.

It is appreciated that if these waveforms are observed over long times, it will be possible to recover statistical indices and to relate them.

To summarize, it is noted that:

- data volumes are increasing;
- it would be useful to have analyzes over long listening times;
- it is necessary to process the parameters in a conjoint analyzis.

Current algorithms do not make it possible to fulfill these various constraints.

If the complexity of the algorithm is merely quadratic this signifies in practice that processing 1 second of listening duration costs 100 times as much, in computation time, as processing 100 ms of listening duration. This becomes 10000 for 10 seconds. Current algorithms often have complexities that are more than quadratic. This prohibits the application of these algorithms over sizable durations although this is interesting for revealing statistical discriminants. We give two examples of non-trivial long-time statistical indices: certain frequency values (ditto PRIs) are often associated over one and the same DOA in one and the same listening; certain radars scan space regularly and exhibit an Antenna Rotation Period or ARP. These indices can be used for long time whereas they cannot be used for short time.

In this context, a need exists for efficient implementations which minimize computational complexity. The optimum of this complexity is linear complexity that is to say the fact that the number of computations increases linearly with the rate of the incoming data. With linear complexity it becomes possible to analyze very sizable volumes of data, therefore to work over long times with a high pulse density.

The principles conventionally used in NSD is generally based on separation by beam intercept times, separation by Direction of Arrival, separation by primary parameters (Fr, PW, IP) or separation by Histogram of Difference Time Of Arrival (HDTOA).

Separation by beam intercept times is based on the statistical decorrelation of the dates of beams for an environment of radars. For a mean density of radars (and having undertaken a first coarse filtering on the DOA or/and the frequency) the illuminations of the various radars appear rarely "interleaved".

This technique is however rather more suitable for warning detectors (or RWR for Radar Warning Receiver) which fulfill their warning role with a sensitivity that does not in general allow them to intercept the radars on scattered lobes. This technique is obviously not suitable for a receiving system which must intercept the radars on scattered lobes (ELINT) or in a dense environment since in this case the system always sees the emissions "interleaved".

A reliable parameter which is easy to use to deinterleave the pulses is the direction of arrival (DOA). It is manifestly obvious that this is the only parameter that a modern radar cannot modulate; this is why the DOA when it is measured has an essential role in the extraction method. But in numerous systems the DOA exhibits a "low" resolution quality of the order of 10°. Moreover, attention must be paid when the DOA measurement is defective (measurement on the cross-polarization of the reception aerials) or when several emissions are observed in the same angular sector.

Another scheme consists in using the primary parameters to separate the pulses. In addition to the DOA parameter, most "conventional" deinterleaving algorithms are based on the use of simple sortings on single-pulse parameters, namely essentially pulse frequency and duration. These extractors based on sortings on single-pulse parameters have been used for many years and can still be used in certain simple situations. The existence will be noted of more elaborate sorting algorithms than in-line simple sortings (pulse by pulse) based on a statistical approach (for example splitting of the modes of an histogram) but which are further reduced to the use of the primary parameters.

The generalization of the pulse to pulse agility and of the agility based on trains of the waveforms makes today difficult or impossible this solution. Indeed in a dense environment it appears impossible in certain angular sectors (even with a sensor with high resolution) to separate two unknown agile emissions by simple frequency sorting. Either the values of brackets are wide and a mixture of the two emissions is obtained. Or else the values of brackets are narrow and each emission is split into a myriad of monofrequency clusters of pulses. To solve the agility two techniques have appeared conjointly:

- on the one hand the use of the DTOA (for Difference of Time Of Arrival).
- on the other hand the use of schemes for recombining the groups of pulses arising from monofrequency sortings (+DOA) with a view to solving the problem due to the agilities.

The introduction of the difference of time of arrival (or DTOA) makes it possible in the case of a pulse train with fixed PRI to track the corresponding pulses; then looking at pulses separated by "equal time intervals" is enough.

The above two steps are found again:

- A step of detecting the grouping of pulses (here a grouping around an RPI) carried out by virtue of a histogram of the DTOAs or a Fourier Transform (FT) of the TOAs.
- A step of selecting the pulses corresponding to an PRI, which we will call "gating".

It is possible to use several types of transformation of the DTOAs improperly all called DTOA histograms (or HDTOA), to cite only the most noteworthy:

- The k-order HDTOA and its possible variants (complete Histogram, Alldiff progressive Histogram, sequential progressive Histogram) which is a simple summation of the numbers of occurrences that a time disparity is observed. This histogram is the one usually cited or used. It is equivalent to the autocorrelation function of the sequence of the TOAs. Its defect is to reveal all the spectral lines of PRIs as well as their linear combinations.
- The so-called "compressed" HDTOA which sums a complex argument used to take into account the periodic character of the DTOAs: Extraction of the Pattern Repetition Period (or PRP). It exhibits defects when pulses are missing, sometimes bringing about losses of the PRP in case of variable PRI (or "staggers" as they are also known).
- The two-dimensional HDTOA which extends the search for the PRIs to the search for significant PRI pairs (or transition). It exhibits the benefit of having a reduced level of interactions compared to the previous ones. Its defect is the computational cost.
- The histogram of the doublets which is very efficient to search for the PRPs. It is shown that it corresponds to a partial construction of the two-dimensional histogram and that it exhibits the same level of interactions. The benefit thereof is to reduce the information contained in the TOAs to just the PRP spectral lines.
- The Fourier Histogram. The techniques based on the construction of histograms of DTOA are not robust to jittered PRIs, especially when there is a mixture. The computation of the Fourier transform of a comb of N Diracs centered at the instants of arrival TOA of the pulses exhibits a maximum at the frequency PRF corresponding to the inverse of the PRI of the pulses. The computation of the FT at all the possible frequencies is however very time-expensive. Various algorithms of this type have been described in the literature.

These histograms have various properties. All these histograms can have high robustness to missing pulses.

The DTOA based gating having isolated an PRI on HDTOA or a PRF on periodogram, a phase of searching for the corresponding pulses is used. Accordingly the pulse trains corresponding to each detected PRP are extracted in several successive sequences. The result is the obtaining of series of pulses at this PRP.

The choice among the variants presented is tightly related to the severity of the environments, to the quality of the primary measurements, and to the power of computation possible with the CPU resource allocated for the application.

The DTOA-based extraction can be extended to any "contrasted" temporal structure of the waveform. It is noted moreover that for the agile and non-agile waveforms the temporal structure (the PRIs) is more discriminating, more characteristic and more stable than the frequency structure. Indeed it is simpler to alter the emission frequencies than the sets of PRIs used.

The deinterleaving techniques based on the DTOA also have their limits and thus their efficiency decreases with the arrival of the WaveForms with Agility of PRI, agility in the sense of an unstable temporal structure. Indeed a variable repetition period (or "Stagger") of PRI is a so-called PRI-agile emission but remains very easy to process by a deinterleaving algorithm based on the DTOA since the pattern is stable over time. Conversely electronic scanning radars can emit a signal which seen from a point in space does not exhibit any apparent temporal structure. In this case the deinterleaving may not be based on the DTOA.

Although the electromagnetic environment is composed of a large quantity of stable PRI pattern waveforms, it will be very useful to take the conventional sorting parameters into account conjointly, in order to solve the case of the rather few signals with unstable PRI. Furthermore the DTOA based techniques can be damaged by the fortuitous synchronism of emissions with identical PRIs and perceived simultaneously by the sensor. In this case the separation information must be afforded by other parameters (DOA, Level, Frequency, PW, IP . . . ).

SUMMARY OF THE INVENTION

An aim of the invention is in particular to correct all or part of the aforementioned drawbacks by proposing a scheme for separating nested trains of radar pulses which is reliable, fast and requires little resource.

For this purpose, the subject of the invention is a method of non-supervised deinterleaving of pulse trains comprising:

- a step Stp10 of constructing, for each parameter or group of parameters, N histograms, N being an integer greater than 1, one-dimensional or multidimensional, defining groups of pulses per parameter or group of parameters, said histograms being representative of the pulse trains;
- a step Stp20 of extracting modes on the basis of said histograms;
- a step Stp30 of constructing groups of interest on the basis of said extracted modes;
- a step Stp40 of enriching the description of the pulses with the aid of labels conveying their membership in at least one group of interest;
- a step Stp50 of non-supervised cross-classing of the modes so as to reorganize the enriched pulses by similarity.

According to one mode of implementation, the step Stp20 comprises:

- a step Stp21 of thresholding the histograms;
- a step Stp22 of decomposing the histograms into modes;
- a step Stp23 of characterizing the modes;

According to one mode of implementation, the step Stp50 of classing the modes consists in progressively creating at least one class of homogeneous pulses-modes, the step comprising:

- on initialization a search for the mode having a maximum of interest, this mode forming the first class, and then, for each remaining mode:
- a step Stp51 of searching, among the remaining modes, for the mode having the largest cardinal of intersection with the current class;
- a step Stp52 of searching for the partition of the mode found, making it possible to maximize a criterion of grouping with the current class or classes;
- a step Stp53 of merging the mode with the current class or classes.

According to one mode of implementation, the step Stp50 of classing comprises:

- a step Stp56 of classifying the pulses as a function of their mutual correlation relationships;
- a step Stp57 of classifying the modes as a function of their mutual correlation relationships;
- a step Stp58 of grouping the modes and pulses into classes.

In an advantageous manner, the method according to the invention, due to its low complexity, makes it possible to analyze the signals received over long times with a high pulse density. It also allows a conjoint analysis of the various statistical parameters or indices.

BRIEF DESCRIPTION OF THE DRAWINGS

Other particular features and advantages of the present invention will be more clearly apparent on reading the description hereinafter, given by way of nonlimiting illustration, with reference to the drawings and Annexes, in which.

DETAILED DESCRIPTION

The method of non-supervised deinterleaving by N-dimensional enrichment according to the invention relies on the conjoint use of the primary parameters and secondary parameters such as for example the difference of time of arrival (DTOA) to separate each emission of interest.

Figure 1:
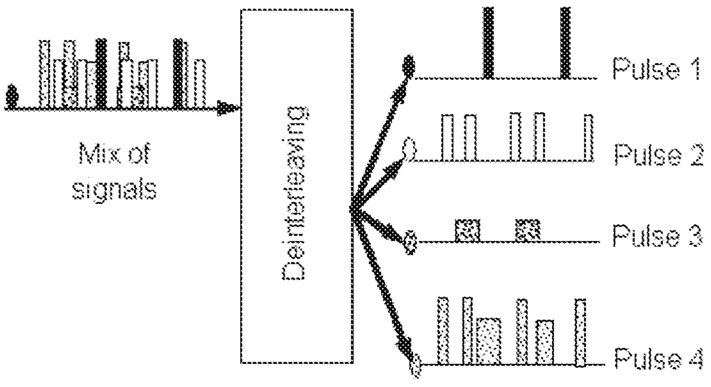
FIG. 1 illustrates the deinterleaving.
Figure 2:
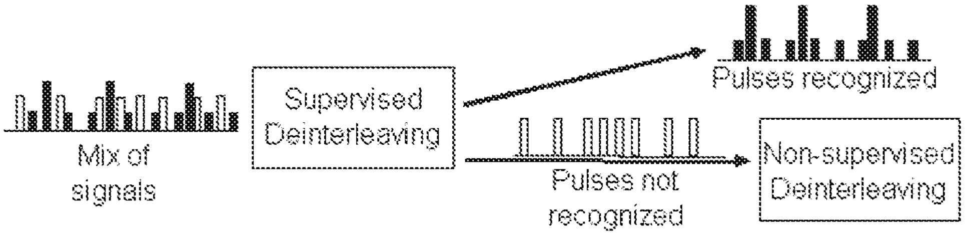
FIG. 2 illustrates the cooperation between the supervised and non-supervised deinterleavings.
Figure 3:
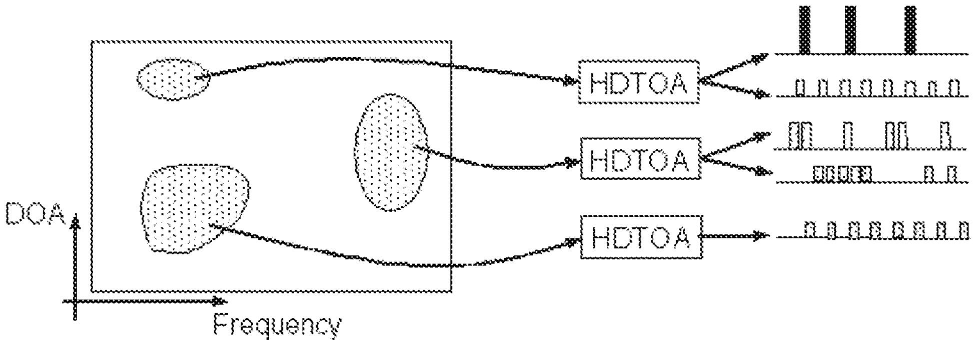
FIG. 3 represents an exemplary non-supervised deinterleaving using RF-DOA classifications followed by HDTOA classifications.
Figure 4:
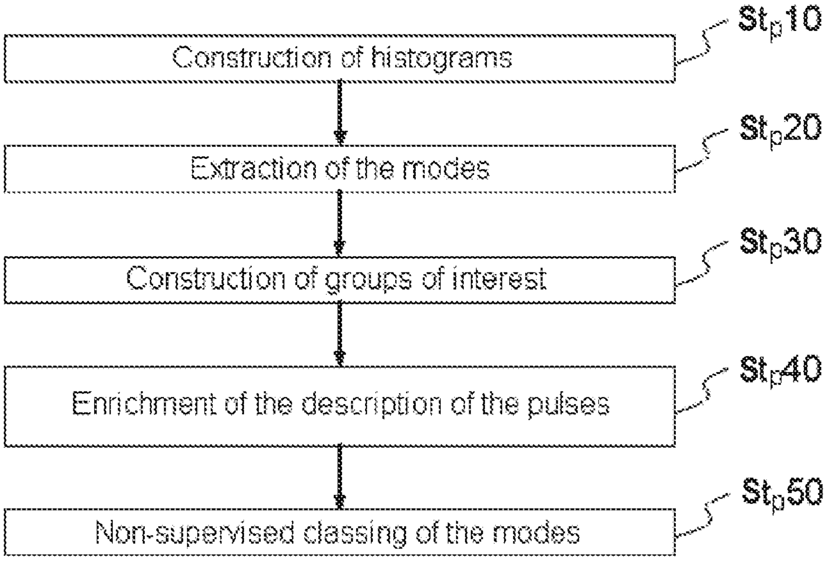
FIG. 4 represents an exemplary implementation of the method according to the invention.

With reference to FIG. 4 the deinterleaving method according to the invention can comprise a step Stp10 of constructing histograms, a step Stp20 of extracting modes, a step Stp30 of constructing groups of interest, a step Stp40 of enriching the description of the pulses and a step Stp50 of non-supervised classing of the modes.

In the course of the step Stp10 histograms are constructed in all the dimensions. This step makes it possible to carry out a conjoint multidimensional description (frequency, DTOA, DOA, phase of the temporal trains, intra-pulse parameters, PW . . . ) of a set of pulses. This conjoint description makes it possible in particular to construct histograms relating primary parameters, such as for example the frequencies, the DOAs, the pulse widths (PW), . . . and secondary parameters such as for example the PRIs. It is also possible to add modes of grouping such as the ARP, and more generally statistical indices constructed over long time such as coocurent PRI or frequency groups, accumulation-point groups, iso-measures of location type.

Figure 5:
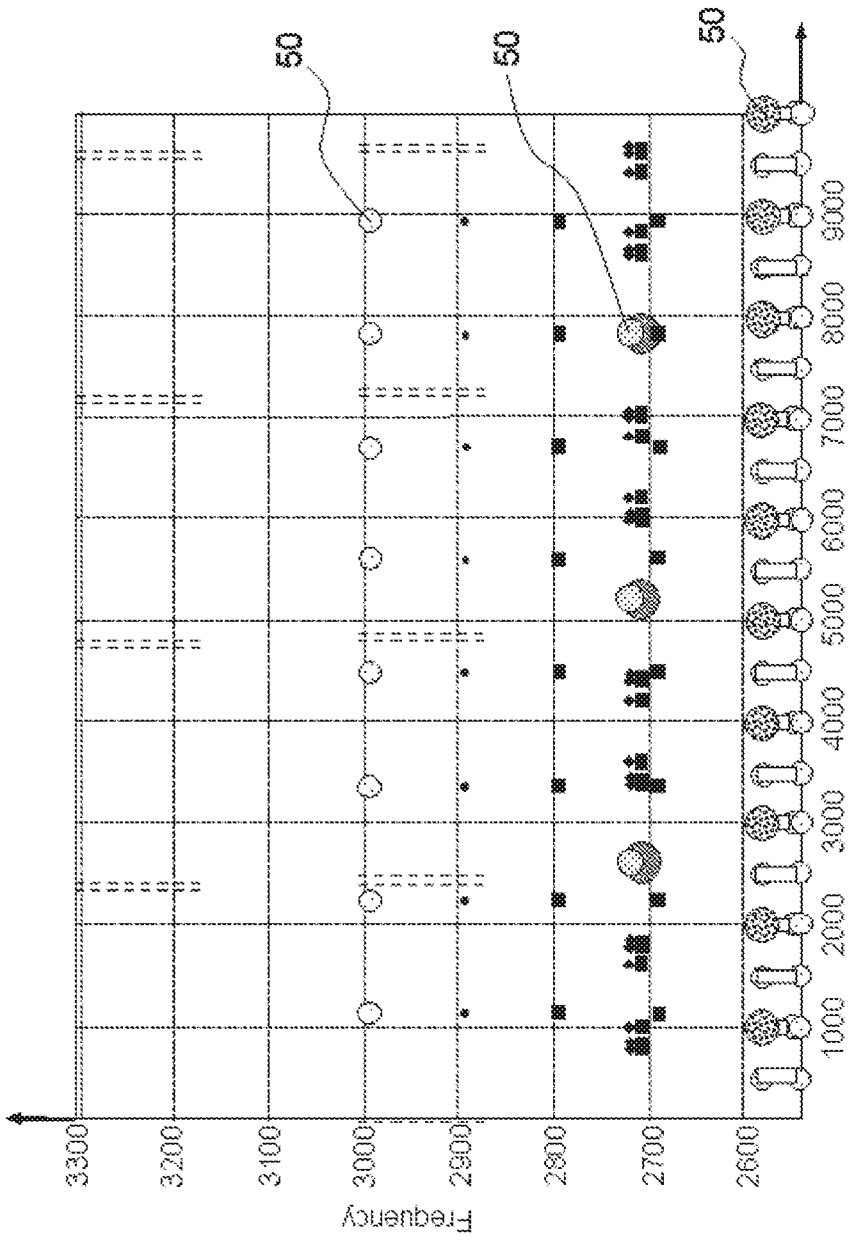
FIG. 5 represents an exemplary graphical representation of an RF-DTOA histogram.

To understand the principle, the most didactic of these histograms is the RF-DTOA histogram associating a primary parameter computed over 1 pulse and a secondary parameter computed over at least 2 pulses. By way of illustration, FIG. 5 represents such a histogram in a frame having the DTOAs as abscissa and the frequencies as ordinate. In this representation, the size of the dots relates to the number of pulses situated in the cell (Frequency, DTOA). It is remarked that this representation makes it possible to easily distinguish the various interleaved waveforms (WF). Accordingly reliance is placed on the horizontal or vertical alignments of dots observed, thus amounting to concentrating interest on the projections on the two axes (here frequency and DTOA) and the relationships between the modes under projection.

It is also easy to recognize the temporal or frequency structures that are the most contrasted with respect to the diffuse structures that is to say the structures comprising the most pulses. It will therefore be possible to begin the gating by concentrating interest on the signals with the most specific characteristics which are therefore easily extractable from the mixture without risk of ambiguity.

Of course the histograms are not limited to those in two dimensions (2D) and it would have been possible to add Azimuth (in z-axis), PW (in v-axis, a fourth one) . . . to the graphical representation. One speaks of N-Dimensional or ND histograms.

Figure 6:
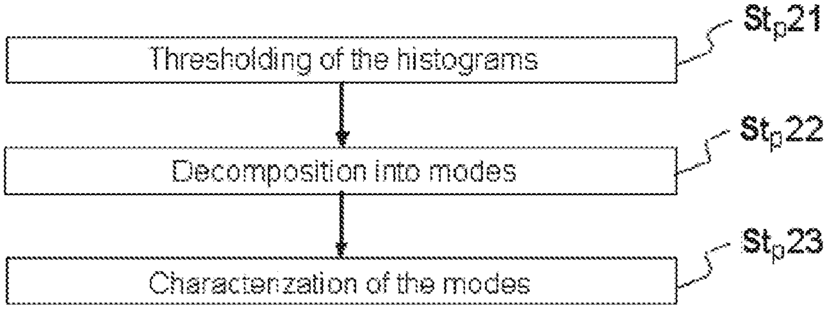
FIG. 6 represents an exemplary implementation of the step of extracting modes.

With reference to FIG. 6, the step Stp20 of extracting modes can comprise a step Stp21 of thresholding the histograms, a step Stp22 of splitting into modes and a step Stp23 of characterizing the modes.

For the thresholding of the histograms, it is possible to distinguish two cases, the one-dimensional case (1D) and the two-dimensional case (2D) in which the DOA is used systematically.

Figure 7A:
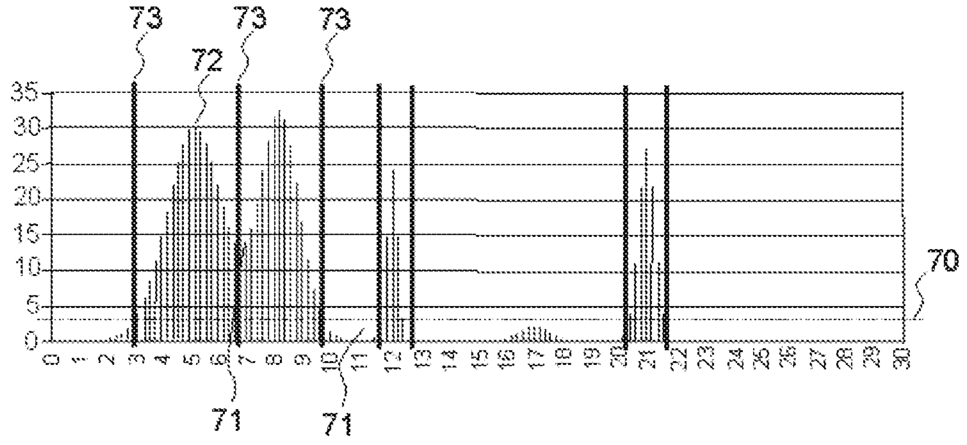
FIGS. 7*a* and 7*b* illustrate the step of extracting the modes of a histogram.
Figure 7B:
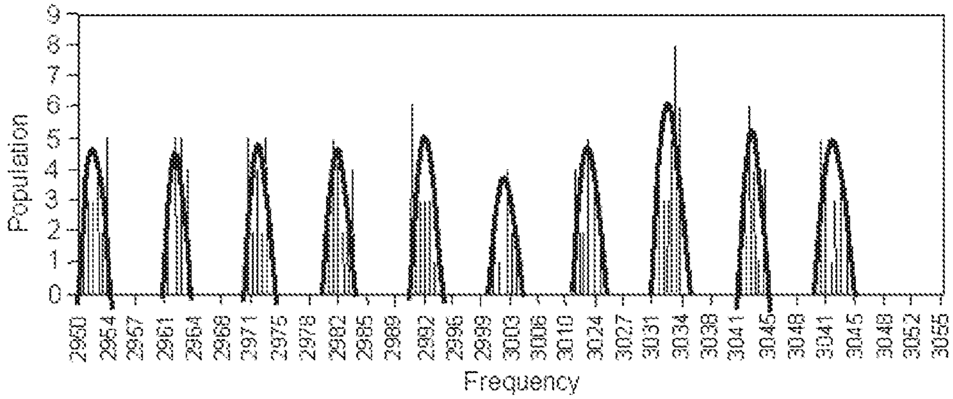

With reference to FIGS. 7*a* and 7*b*, the histograms are thresheld so as to eliminate the insignificant values, that is to say less than a predetermined threshold value 70.

The step Stp 22 of splitting into modes consists in selecting separators in the "valleys" 71 of the histogram which are situated between two peaks 72 and for which the difference of height between the valley 71 and the peaks 72 is significant. The statistical significance can be determined according to a khi2 test, for example with the formula:

$$\chi = \frac{2(HV - HE)^2}{HE} \geq \chi^2_{\alpha,1}$$

Where HV is equal to the height of the histogram in the "valley" 71 and HE is the mean value of the heights in the "valley" 71 and for the peak of lower height. For a confidence of 95%, $\chi_{0.05,1}{}^2=3.843$.

Each mode is thereafter characterized by its mean and its standard deviation, for example by Gaussian approximation. The modes are extended beyond the separators 73 by retaining the values, for example, within plus or minus 3 estimated sigmas (sigma being the standard deviation). In most cases the extracted modes do not exhibit any mixing. When two peaks are close, it is decided that the data belong to both peaks.

In the case where the Azimuth is used systematically for each dimension (2D case) the step of extracting the modes can use an algorithm for detecting the maxima and then a splitting of the modes around these maxima for example by a watershed segmentation scheme.

The modes of these histograms define groups (or clusters) of pulses per parameter. Each group can be described by the mean value of the parameter, the standard deviation, the number of occurrences and by the list of consecutive pulses. It is possible thereafter to compute the contrast of each mode and these modes can be classed by decreasing contrast. Thus, groups of pulses or groups of interest are formed in the course of a step Stp30, by exploration of the modes in all dimensions in order of decreasing number of occurrences. The groups formed are characterized by their parameters such as for example DOA, RF list, PRP, Phase, intrapulse parameters . . . .

Each pulse is thereafter enriched in the course of a step Stp40 of enriching the description of the pulses by its membership in a group (F, DOA) or in several groups (PRP, phase, DOA). Thus, the modes in the various dimensions and the pulses with enriched description are available after N-dimensional enrichment.

The enriched pulses can take the form of a table of enriched pulses. By way of illustration Annex 1 presents an example of such a table.

The groups of pulses formed in the various dimensions or modes are not only characterized by their mean value, experimental standard deviation, number of occurrences but also by the list of labels of the pulses belonging to the mode as illustrated in Annex 2.

In another embodiment of the invention, this list of labels can be coded in the form of a table of binary values indicating whether or not pulse i belongs to the mode.

In an advantageous manner, the storage of the labels of the pulses on the various modes allows the computation of correlation relationships between modes. This makes it possible to avoid having to iterate on sequential sortings of pulses.

The scheme relies on the individuals/variables duality. Here the pulses are the individuals and the various modes (DTOA, Frequencies, DOA, PW . . . ) are the variables. The variables will be processed by using the individuals that are related to each value of the variable (mode) so as to obtain diverse information.

The interest in enrichment resides in the fact of measuring the properties of the modes and their relations, that is to say their membership in one and the same train, by intersection and union operators acting on the lists of pulses belonging to each significant mode.

A distinction is made between the intra-dimension correlation relationship, for example between two frequencies or two PRPs, and the inter-dimension correlation relationship, for example between a frequency and a PRP.

For the bi-pulse parameters, the correlation relationship between two modes can be given by the set-theoretic distance. The correlation relationship between two PRPs can be given by the formula:

$$d(R_1, R_2) = \frac{\mathrm{card}(R_1 \cup R_2) - \mathrm{card}(R_1 \cap R_2)}{\mathrm{card}(R_1 \cup R_2)}$$

For the mono-pulse parameters, the correlation relationship between two modes can be given by the conventional euclidian distance.

The inter-dimension correlation relationship between a detected PRP and a frequency can be produced by considering the cardinality of the intersection between the lists of pulses of the PRP and of the Frequency which are considered.

$$d(R_{i,F}, R_{j,PRP}) = 1 - \frac{\mathrm{card}(R_{i,F} \cap R_{j,PRP})}{\mathrm{card}(R_{i,F})}$$

On the basis of these inter and intra-dimension correlation relationships it is thus possible to group together the modes which are simultaneously close.

An important property of the enrichment is that it is possible to retrieve the conjoint multidimensional modes on the basis of the low-dimensional modes constructed and of the table of enriched pulses. This storage is moreover linear that is to say that it remains proportional to the number of pulses. A direct coding of the multidimensional statistic would be much more expensive in terms of computation time.

With reference to Annex 4, the aim of step Stp50 is to reorganize the enriched pulses or pulses-modes tables so as to highlight the various classes of pulses. This reorganization uses a cross-classification whose main objective is to simultaneously provide a partition of the two sets individuals and variables. This classification can be carried out by several schemes depending on the type of data tables envisaged (binary table, contingency table . . . ).

The sought-after aim is to form classes or blocks of homogeneous pulses-modes. It is desired that the pulses of one and the same class resemble one another and do not resemble those of the other classes. By pulses/modes symmetry, a criterion regarding the modes is also obtained: the modes of one and the same class resemble one another since their lists of pulses exhibit large intersections.

The following similarity criteria are therefore defined:

In one and the same class:

The pulses share a maximum of components;

The components share a maximum of pulses.

Between two classes:

The pulses share a minimum of components;

The components share a minimum of pulses.

Constraints are also employed so as to accelerate the classing. By way of example, these constraints may be:

Two "disjoint" DOA components (ditto for two PRP components) cannot belong to one and the same class;

The frequencies of one and the same "phase of PRP" must not be separated; Etc. . . .

The processing can be performed using the similarity criteria alone or using the similarity criteria and the constraints. The use of the similarity criteria is enough to obtain the optimal result, the constraints are merely a computational accelerator. In certain cases, it will be possible to perform the classing using only the constraints.

The criterion of similarity between pulses or correlation relationship between two pulses can be given by the formula:

$$C_{ii'} = \sum_{j=1}^{P} x_i^j x_{i'}^j$$

Where $x_i^j$ represents a binary indicator indicating whether pulse i belongs to mode j defined by:

$x_i^j=1$ if pulse i belongs to mode j $x_i^j=0$ if pulse i does not belong to mode j And where P represents the total number of modes.

Likewise, in a symmetric manner, it is possible to define a criterion of similarity between modes by the formula:

$$C^{jj'} = \sum_{i=1}^{N} x_i^j x_i^{j'}$$

Where $x_i^j$ represents a binary indicator indicating whether mode j contains pulse i defined by:

$x_i^j=1$ if mode j contains pulse i $x_i^j=0$ if pulse i does not belong to mode j And where N represents the total number of pulses.

Calculating the similarity criterion amounts to taking the scalar product of two pulses or two modes. Annex 5a illustrates through examples the criterion of similarity between the pulses $I_1$ and $I_2$ as well as the criterion for the pulses $I_3$ and $I_4$. $C_{I1,I2}=4$ signifies that the pulses $I_1$ and $I_2$ are both present in 4 modes (cf. ringed boxes).

Likewise, Annex 5b presents the criterion of similarity between the modes AOA1 and PRP1 as well as that between the modes AOA2 and F1.

To produce a homogeneous group of pulses-modes or grouping of interest, we shall define a grouping criterion. Accordingly, we seek a partition into classes where the individuals of the class are the most similar to one another and the individuals of different classes the most dissimilar. A partition of the pulses can be defined by a binary square matrix X whose general term is defined by:

$$X_{ii'} = \begin{cases} 1 & \text{if } i \text{ and } i' \text{ are in the same class} \\ 0 & \text{otherwise} \end{cases}$$

Several criteria can correspond to this definition. Among them is the Condorcet criterion. It can be written in the following manner:

$$C(X) = \sum_{i=1}^{N} \sum_{i'=1}^{N} (C_{ii'} X_{ii'} + \overline{C}_{ii'} \overline{X}_{ii'})$$

Where: N represents the number of pulses, $C_{ii'}$ represents the criterion of similarity between the pulses $I_n$ and $I_{n'}$ $X_{ii'}$ represents the element of rank i,i' of the square matrix X defined above.

The tables in Annex 6b and 6c present examples of partition into various classes of a classification of 20 pulses and 10 modes, as is presented in Annex 6a.

Annex 6b represents a classification of the pulses and modes into 3 classes $Cl_1$, $Cl_2$ and $Cl_3$. In the example the classes 3 and 2 share the frequency F2, and the classes $Cl_2$ and $Cl_1$ share the frequencies F3 and F4. For this partition, the criterion is 1076. This classing is optimal that is to say it exhibits a maximum criterion.

Annex 6c presents an alternative classing into 5 different classes $Cl_{11}$, $Cl_{12}$, $Cl_{13}$, $Cl_{14}$ and $Cl_{15}$. This partition is not optimal, the value of the criterion for this partition is 912 therefore less than 1076.

A first exemplary mode of implementation of the step Stp50 of non-supervised classing will be presented. This classing of the modes consists mainly in progressively creating at least one class of homogeneous pulses-modes. This classing comprises on initialization a search for the mode having a maximum of interest that is to say the mode having the largest cardinal. This mode will form the first class, and then, for each remaining mode, the classing comprises:

- a step Stp51 of searching, among the remaining modes, for the mode having the largest cardinal of intersection with the current class;
- a step Stp52 of searching for the partition of the mode found, making it possible to maximize a criterion of grouping with the current class or classes;
- a step Stp53 of merging the mode with the current class or classes.

The initialization of the step consists in searching for the mode which is the most interesting to take first, that is to say the mode whose contribution to the criterion is the greatest. This mode will form the first class $C_1$.

It is recalled that the contribution to the criterion of mode q is given by the formula:

$$Contrib(q)=\sum_{i\in C_q, i'\in C_q} C_{ii'} - \alpha \sum_{i\in C_q, i'\in C_q} \min(C_{ii}, C_{i'i'})$$

Where: $C_{ii'}$ represents the similarity or the correlation relationship between modes i and i', $\alpha$ represents a scalar that may be taken equal to 1

Interest is concentrated thereafter on the intersection between this first class and the remaining modes, interest is concentrated more particularly on the cardinal of this intersection.

According to a first mode of implementation of the method it is possible to class the modes remaining in descending order of intersection cardinals.

According to another mode of implementation, a search is conducted among the modes remaining for the one whose cardinal of intersection is the largest. This mode will form the class $C_2$.

Figure 8:
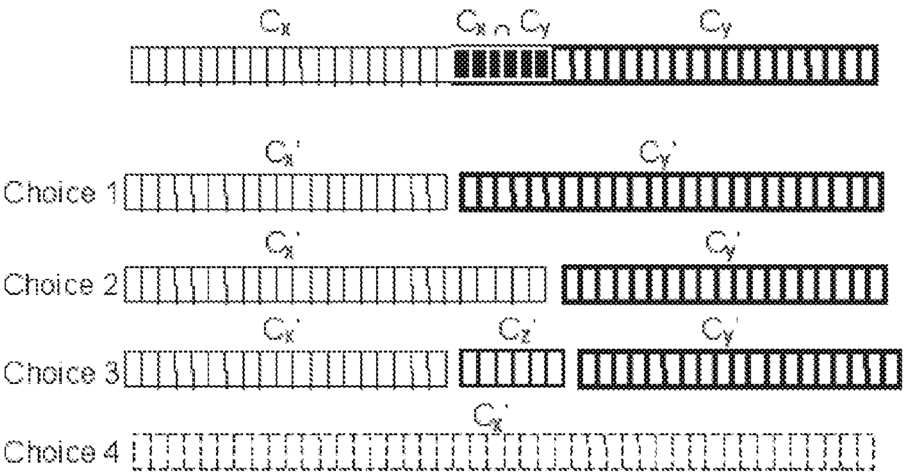
FIG. 8 represents various choices of possible classification.

With reference to FIG. 8, if one considers the classes $C_1$ and $C_2$, ($C_x=C_1$ and $C_y=C_2$), there exist four choices possible for the grouping of these classes. The intersection $C_1 \cap C_2$ can belong to the new class $C'_2$ (choice 1), to the new class $C'_1$ (choice 2) or can form a new class $C'_3$ (choice 3). A fourth option consists in considering a new class $C'_1$ grouping together the classes $C_1$ and $C_2$ (choice 4).

These four options are therefore considered and for each of them the corresponding grouping criterion is computed and the choice which maximizes said grouping criterion is retained.

One continues thus, for each remaining mode, each time considering the intersection between the class or classes ($C'_1$, $C'_2$, $C'_3$) just formed and the mode having the largest cardinal of intersection with the new class or classes.

- If choice 1 is retained, the new classes formed are: $C'_1=C_1-C_2$ and $C'_2=C_2$;
- If choice 2 is retained, the new classes become: $C'_1=C_1$ and $C'_2=C_2-C_1$;
- If choice 3 is retained, the new classes become: $C'_1=C_1$, $C'_2=C_2$ and $C'_3=C_1 \cap C_2$;
- If choice 4 is retained, the new class becomes: $C'_1=C_1 \cup C_2$.

We are concerned only with the non-empty intersections. In the case where the mode considered were to have a empty intersection, it would form a new class.

As cited previously, constraints for accelerating the computation are also available. Therefore for each mode considered, a search is conducted for the choice which maximizes the criterion and which complies with the constraints.

It should be noted that several data are classed at a time. Indeed each class Cx and Cy are classes of pulses.

With reference to Annexes 8 to 15, the step Stp 50 of non-supervised classing will be illustrated through a wholly non-limiting example. In this example we shall consider 20 pulses $I_1$ to $I_{20}$.

Annex 6a corresponds to the information obtained after the enrichment processing of the pulses. This table crosses the pulses and the various modes ($DOA_i$, $F_i$, $PRP_i$).

After classing the modes in ascending order of their contribution the table in Annex 7 is obtained.

The non-supervised classing is begun with the mode 10 (PRP3). This mode contains the pulses $I_{12}$ to $I_{20}$ which will form the first class $C_1$. The mode whose cardinal of intersection with the class C1 is the highest, namely the mode 9 (DOA3), is considered thereafter. Modes 9 and 10 are identical, therefore we have the case in point where $C_x \cap C_y=C_x \cup C_y=C_x=C_y$, the 4 choices are therefore identical. Modes 10 and 9 therefore form a single class $C_1=\{I_{12},I_{13},I_{14},I_{15},I_{16},I_{17},I_{18},I_{19},I_{20}\}$ (cf. Annex 8).

Mode 8 (F4) is considered thereafter which is the mode having the largest intersection with the class C1 ($\overline{C_1 \cap F_4}=5$) (cf. Annex 9).

The following 4 choices are tested:

$C_{1'}=C_1-F_4$, $F_{4'}=F_4$ (criterion 243)

$C_{1'}=C_1$, $F_{4'}=F_4-C_1$ (criterion303)

$C_{1'}=C_1-F_4$, $F_{4'}=F_4-C_1$, $C_{2'}=C_1 \cap F_4$ (criterion 263)

$C_{1'}=C_1 \cup F_4$ (criterion 235)

The highest criterion being 303, we retain the solution consisting in separating the modes into two classes, namely $C_1=\{I_{12},I_{13},I_{14},I_{15},I_{16},I_{17},I_{18},I_{19},I_{20}\}$ and $C_2=\{I_{10},I_{11}\}$.

We continue (cf. Annex 10 a) by considering the mode 7 (F3) which is the next mode having the largest intersection with the new class C1 ($\overline{C_1 \cap F_3}=3$)

As above, the following 4 choices are tested:

$C_{1'}=C_1-F_3$, $F_{3'}=F_3$ (criterion 251)

$C_{1'}=C_1$, $F_{3'}=F_3-C_1$ (criterion 307)

$C_{1'}=C_1-F_3$, $F_{3'}=F_3-C_1$, $C_{z'}=C_1 \cap F_3$ (criterion 267)

$C_{1'}=C_1 \cup F_3$ (criterion 231)

On completion of this step (cf. Annex 10 b), taking the highest criterion into account ends in 3 new classes: $C_1=\{I_{12},I_{13},I_{14},I_{15},I_{16},I_{17},I_{18},I_{19},I_{20}\}$, $C_2=\{I_{10}I_{11}\}$ and $C_3=\{I_8,I_9\}$.

It may be remarked that by using the constraints in PRP or in DOA (cf. Annex 11), namely "two disjoint DOA components (or two disjoint PRP components) may not belong to one and the same class", would have made it possible to carry out this step more quickly for the same result. Taking these constraints into account would have prohibited the formation of one and the same class with modes not having the same DOA. The same reasoning can be applied in respect of modes not having the same PRP.

We continue (cf. Annex 12a) by considering mode 6 ($\overline{C_2 \cap PRP_2}$=2) and the following 4 choices are tested:

$$C_{2'}=C_2-PRP_2=\emptyset,\ PRP_{2'}=PRP_2 \quad \text{(criterion 84)}$$

$$C_{2'}=C_2,\ PRP_{2'}=PRP_2-C_2 \quad \text{(criterion 68)}$$

$$C_{2'}=C_2-PRP_2=\emptyset,\ PRP_{2'}=PRP_2-C_2,\ C_{z'}=C_2 \cap PRP_2=C_2 \quad \text{(identical to the previous choice)}$$

$$C_{2'}=C_2 \cup PRP_2=PRP_2 \quad \text{(identical to the first choice)}$$

At this stage there are 3 classes: $C_1=\{I_{12},I_{13},I_{14},I_{15},I_{16},I_{17},I_{18},I_{19},I_{20}\}$, $C_2=\{I_6,I_7,I_8,I_9,I_{10}I_{11}\}$ and $C_3=\{I_8,I_9\}$. We continue by testing the intersection of mode 6 with the class C3 ($\overline{C_3 \cap PRP_2}$=2). The outcome is identical, there are only two choices.

On completion of this step (cf. Annex 12b) there are therefore 2 classes namely: $C_1=\{I_{12},I_{13},I_{14},I_{15},I_{16},I_{17},I_{18},I_{19},I_{20}\}$ and $C_2=\{I_8,I_9,I_{10},I_{11}\}$. The former classes $C_2$ and $C_3$ which were separated are now joined together.

We continue by considering mode 5 (DOA2). As DOA2=C2 the solution remains identical.

We continue (cf. Annex 13) by considering mode 4 (F2). The intersection between mode 4 and class 1 being zero ($\overline{C_1 \cap F_2}$=0), there is no test to be performed. $\overline{C_2 \cap F_2}$=2, the 4 choices are tested:

$$C_{2'}=C_2-F_2,\ F_{2'}=F_2 \quad \text{(criterion 179)}$$

$$C_{2'}=C_2,\ F_{2'}=F_2-C_2 \quad \text{(criterion 207)}$$

$$C_{2'}=C_2-F_2,\ F_{2'}=F_2-C_2,\ C_{2'}=C_2 \cap F_2 \quad \text{(criterion 191)}$$

$$C_{2'}=C_2 \cup F_2 \quad \text{(criterion 123)}$$

On completion of this step, a new class $C_3$. We have the classes: $C_1=\{I_{12},I_{13},I_{14},I_{15},I_{16},I_{17},I_{18},I_{19},I_{20}\}$, $C_2=\{I_6,I_7,I_8,I_9,I_{10},I_{11}\}$ and $C_3=\{I_3,I_4,I_5\}$ Mode 3 (F1) is now considered. This mode is not concerned by classes $C_1$, $C_2$ and $C_3$ ($\overline{C_1 \cap F_1}$=0 $\overline{C_2 \cap F_1}$=0 and $\overline{C_3 \cap F_1}$=0).

We continue (cf. Annex 14) with mode 2 (PRP1). This mode is not concerned by class $C_1$ or on class $C_3$ ($\overline{C_1 \cap PRP_1}$=0 and $\overline{C_2 \cap PRP^{I}}$=0). Mode 2 has a non-empty intersection with class $C_3$ ($\overline{C_3 \cap PRP_1}$=3), therefore the 4 choices are tested:

$$C_{3'}=C_3-PRP_1=\emptyset,\ PRP_{1'}=PRP_1 \quad \text{(criterion 63)}$$

$$C_{3'}=C_3,\ PRP_{1'}=PRP_1-C_3 \quad \text{(criterion 51)}$$

$$C_{3'}=C_3-PRP_1=\emptyset,\ PRP_{1'}=PRP_1-C_3,\ C_{z'}=C_3 \cap PRP_1=C_3 \quad \text{(identical case to the second choice)}$$

$$C_{3'}=C_3 \cup PRP_1 \quad \text{(identical case to the first choice)}$$

The first choice is retained, there are therefore 3 classes: $C_1=\{I_{12},I_{13},I_{14},I_{15},I_{16},I_{17},I_{18},I_{19},I_{20}\}$, $C_2=\{I_6,I_7,I_8,I_9,I_{10},I_{11}\}$ and $C_3=\{I_1,I_2,I_3,I_4,I_5\}$.

It is remarked that this solution could have been directly accessible by using only the constraints on the PRPs and the DOAs.

As mode 1 (DOA1) is identical to class C3, the solution remains unchanged. The final solution (cf. Annex 15) is therefore a partition into three classes: $C_1=\{I_{12},I_{13},I_{14},I_{15},I_{16},I_{17},I_{18},I_{19},I_{20}\}$, $C_2=\{I_6,I_7,I_8,I_9,I_{10},I_{11}\}$ and $C_3=\{I_1,I_2,I_3,I_4,I_5\}$.

Figure 9:
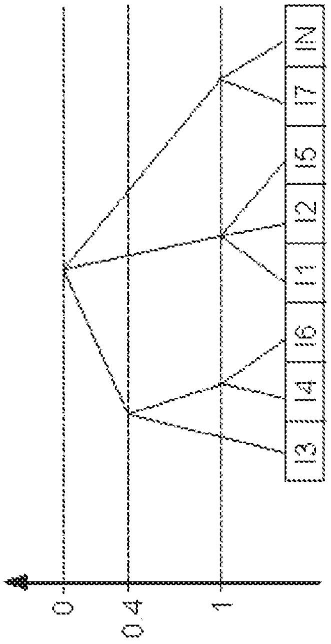
FIG. 9 represents an exemplary pyramidal structure illustrating the correlation relationships between pulses.
Figure 10:
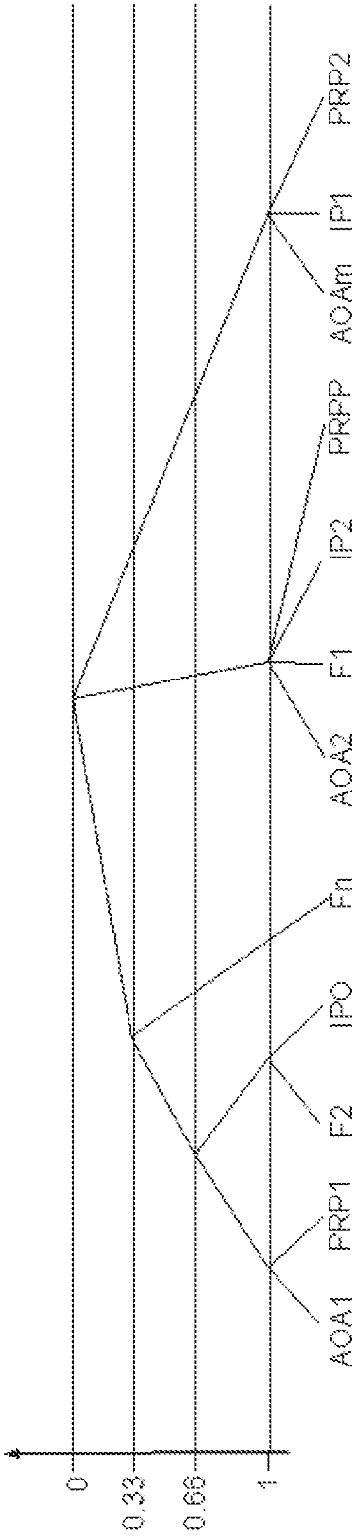
FIG. 10 represents an exemplary pyramidal structure illustrating the correlation relationships between modes.

With reference to Annexes 16 to 19 and to FIGS. 9 and 10 a new example of mode of implementation of the non-supervised classing step will be presented. This classing relies on a binary cross-classification of the modes. This scheme mainly comprises three steps, a step Stp 56 of classifying the pulse vectors as a function of their correlation relationship, a step Stp 57 of classifying the mode vectors as a function of their correlation relationship, a step Stp 58 of grouping the modes and pulses into classes.

Annex 16 represents a table of N unclassed enriched pulses, denoted $I_1$ to $I_N$, comprising various modes.

Annex 17 represents a table of the correlation relationships between pulse vectors indicating the correlation relationships between each pulse. It is possible to organize these correlation relationships from the highest correlation to the lowest correlation. For example, at the 1 level, it is possible to bring together $I_4$ and $I_6$ or $I_1$, $I_2$, and $I_5$ since they have the same correlation relationship. Likewise, at the 0.4 level the pulses $I_3$, $I_4$ and $I_6$ converge. After having fixed a threshold at a value $S_1$, the pulses whose correlation relationship is less than this threshold of correlation $S_1$ are brought together. The pulses $\{I_1, I_2, I_5\}$, $\{I_7, I_N\}$ and {(I4,I6), (I3)} can therefore be grouped together. Thus, in the table in Annex 16 when the pulse vectors are brought together according to the correlation relationships, the reclassed table presented in Annex 18 is obtained.

As the classing uses a cross-classification scheme, the classing step also uses the correlation relationships between modes. Annex 19 presents the correlation relationships between the various modes. It is recalled that the correlation relationships d between two pulses or between two modes can be computed with the aid of the formula:

$$d(R_1, R_2) = \frac{\mathrm{card}(R_1 \cup R_2) - \mathrm{card}(R_1 \cap R_2)}{\mathrm{card}(R_1 \cup R_2)}$$

As previously these correlation relationships between modes can be represented in the form of a pyramidal structure presented in FIG. 10. This structure reveals groupings of modes. After having fixed a second correlation threshold at a value $S_2$, the modes whose correlation relationship is less than this correlation threshold $S_2$ are brought together. In our example, the modes $\{AOA_1, PRP_1, F_2, IPo, F_N\}$, $\{AOA_2, F_1, IP_2, PRP_p\}$ and $\{AOA_m, IP_1, PRP_2\}$ can therefore be grouped together. The reclassed table in Annex 20 is thus obtained. Groupings of interest ($Cl_1$, $Cl_2$, $Cl_3$) corresponding to the various classes are revealed in this reorganized table. The groupings of interest can be read in the blocks of 1 of the reorganized matrix.

The solution obtained will depend on the correlation thresholds chosen. By choosing a threshold of 1, a solution is obtained in which all the modes and/or all the pulses are grouped together; there is maximum confusion. Conversely by choosing a threshold of 0, maximum dispersion of the modes and pulses is obtained.

In an advantageous manner, this implementation is much faster than the scheme presented previously since it uses binary values only. This implementation can therefore be projected onto hardware working in binary and extremely elementary computational hardware components such as for example FPGAs (Field Programmable Gate Arrays) which will process the algorithm. Moreover these hardware components will be able to parallelize the computations thus reducing the processing times.

In the algorithm for searching for the optimal classing we are led in various steps to compute the similarities or the correlation relationships of all the classes 2 by 2 i.e. for a pair of classes C:

$$\sum_{i \in C_l, i' \in C_{q'}} C_{ii'}$$

If the 2 classes comprise n and m pulses respectively, then the complexity of this computation will be order O(n×m). This complexity can be avoided. Indeed:

$$\sum_{i,i'} C_{ii'} = \sum_{i,i'} \sum_{j=1}^{P} x_i^j x_{i'}^j = \sum_{j=1}^{P} \sum_{i,i'} x_i^j x_{i'}^j$$

then $$\sum_{i,i'} x_i^j x_{i'}^j = \sum_{i} x_i^j \sum_{i'} x_{i'}^j = r_j^q r_j^{q'}$$

and finally $$\sum_{i \in C_l, i' \in C_{q'}} C_{ii'} = \sum_{j=1}^{P} r_j^q r_j^{q'} = \vec{R}^q \cdot \vec{R}^{q'}$$

A computation of order O(n+m) is then obtained, where n and m represent the number of pulses of the two classes.

A computation which was quadratic has thus been transformed into a computation of linear complexity.

If the Condorcet criterion used previously is considered, this criterion may be written in the following manner:

$$C(X) = \sum_{i=1}^{n} \sum_{i'=1}^{n} (C_{ii'} X_{ii'} + \overline{C}_{ii'} \overline{X}_{ii'})$$

This computation is apparently quadratic. It can be reduced to linear by virtue of the pre-established principle:

$$C(X) = \sum_{i=1}^{n} \sum_{i'=1}^{n} C_{ii'} X_{ii'} + \sum_{i=1}^{n} \sum_{i'=1}^{n} \overline{C}_{ii'} \overline{X}_{ii'}$$

$$\sum_{i \in C_l, i' \in C_q} C_{ii'} = \vec{R}^l \cdot \vec{R}^q \text{ and } \overline{C}_{ii'} - \text{Min}(C_{ii}, C_{i'i'}) - C_{ii'}$$

whence:

$$C(X) = \sum_{l} \vec{R}^l \cdot \vec{R}^l - \sum_{l, q \neq l} \vec{R}^l \cdot \vec{R}^q + \sum_{l, q \neq l} \text{Min}\left(\vec{R}^l \cdot \vec{R}^l, \vec{R}^q \cdot \vec{R}^q\right)$$

An expression computable in O(n) is thus obtained.

In the present patent application, processing schemes with linear complexity have been described. Of course, these schemes are not the only ones that may be used and the deinterleaving method according to the invention can also be carried out using nonlinear complexity schemes.

Annexes 1-20 described above are listed below in the Appendix to the Specification.

| | | | main PRP | | secondary PRP | |
|---|---|---|---|---|---|---|
| | frequency | group f | group PRM | phase | | |
| imp 1 | f1 | 1 | 1 | p1 | | |
| ... | | | | | | |
| imp i | fi | 1 | 1 | pi | | |
| imp j | fj | 2 | 4 | pj | | |
| ... | | | | | | |
| ... | | | | | | |
| imp n | fn | 2 | 4 | pn | | |

Annex 1

| RF Group | nr of occurences | mean | ect | list of pulses of the group | | | | | | | |
|---|---|---|---|---|---|---|---|---|---|---|---|
| G1 | | | | 1 | 2 | 18 | 21 | ........................ | | | 392 |
| G2 | | | | 186 | 201 | 209 | 312 | ......... | 415 | NA | NA |
| . | | | | | | | | | | | |
| . | | | | | | | | | | | |
| Gn | | | | 39 | 53 | ........... | | 78 | NA | ............ | NA |

Annex 2

| RF Group | nr of occurences | mean | ect | I1 | I2 | I3 | I4 | I5 | I6 | I7 | I8 | .................. | In |
|---|---|---|---|---|---|---|---|---|---|---|---|---|---|
| G1 | | | | 1 | 0 | 1 | 0 | 0 | 0 | 1 | 0 | | 0 |
| G2 | | | | 0 | 0 | 0 | 1 | 0 | 0 | 0 | 1 | | 1 |
| . | | | | | | | | | | | | | |
| . | | | | | | | | | | | | | |
| Gn | | | | 0 | 1 | 0 | 0 | 1 | 0 | 0 | 0 | | 0 |

Annex 3

| | Modes \ imp. | I1 | I2 | I3 | I4 | I5 | I6 | I7 | ... | In |
|---|---|---|---|---|---|---|---|---|---|---|
| DOA Modes | DOA1 | 0 | 0 | 1 | 1 | 0 | 1 | 0 | | 0 |
| | DOA2 | 1 | 1 | 0 | 0 | 1 | 0 | 0 | | 0 |
| | DOA 3 | 0 | 0 | 0 | 0 | 0 | 0 | 1 | | 1 |
| | DOA*n* | ... | ... | ... | ... | ... | ... | ... | | ... |
| Freq Modes | Fréq. 1 | 1 | 1 | 0 | 0 | 1 | 0 | 0 | | 0 |
| | Fréq. 2 | 0 | 0 | 0 | 1 | 0 | 1 | 0 | | 0 |
| | Fréq. 3 | 0 | 0 | 1 | 0 | 0 | 0 | 0 | | 0 |
| | F*n* | ... | ... | ... | ... | ... | ... | ... | | ... |
| Modes PW | LI1 | 0 | 0 | 0 | 0 | 0 | 0 | 1 | | 1 |
| | LI2 | 1 | 1 | 0 | 0 | 1 | 0 | 0 | | 0 |
| | LI3 | 0 | 0 | 0 | 1 | 0 | 1 | 0 | | 0 |
| | LI*n* | ... | ... | ... | ... | ... | ... | ... | | ... |
| Modes PRP | PRM 1 | 0 | 0 | 1 | 1 | 0 | 1 | 0 | | 0 |
| | PRM 2 | 0 | 0 | 0 | 0 | 0 | 0 | 1 | | 1 |
| | PRM 3 | 1 | 1 | 0 | 0 | 1 | 0 | 0 | | 0 |
| | PRM *n* | ... | ... | ... | ... | ... | ... | ... | | ... |

Pulses-modes array

DNS

Class 1 Class 2 Class 3

| Modes \ Imp | I3 | I4 | I6 | I1 | I2 | I5 | I7 | In |
|---|---|---|---|---|---|---|---|---|
| DOA1 | 1 | 1 | 1 | 0 | 0 | 0 | 0 | 0 |
| Fréq. 2 | 0 | 1 | 1 | 0 | 0 | 0 | 0 | 0 |
| Fréq. 3 | 1 | 0 | 0 | 0 | 0 | 0 | 0 | 0 |
| LI3 | 0 | 1 | 1 | 0 | 0 | 0 | 0 | 0 |
| PRM1 | 1 | 1 | 1 | 0 | 0 | 0 | 0 | 0 |
| DOA2 | 0 | 0 | 0 | 1 | 1 | 1 | 0 | 0 |
| Fréq.1 | 0 | 0 | 0 | 1 | 1 | 1 | 0 | 0 |
| LI2 | 0 | 0 | 0 | 1 | 1 | 1 | 0 | 0 |
| PRM3 | 0 | 0 | 0 | 1 | 1 | 1 | 0 | 0 |
| DOA3 | 0 | 0 | 0 | 0 | 0 | 0 | 1 | 1 |
| Freq.4 | 0 | 0 | 0 | 0 | 0 | 0 | 1 | 1 |
| LI1 | 0 | 0 | 0 | 0 | 0 | 0 | 1 | 1 |
| PRM2 | 0 | 0 | 0 | 0 | 0 | 0 | 1 | 1 |
| ... | 0 | 0 | 0 | 0 | 0 | 0 | 0 | 0 |

Reoganized pulses-modes array

Annex 4

| | I1 | I2 | I3 | I4 | I5 | I6 | I7 | ... | IN |
|---|---|---|---|---|---|---|---|---|---|
| AOA 1 | 0 | 0 | 1 | 1 | 0 | 1 | 0 | | 0 |
| AOA 2 | 1 | 1 | 0 | 0 | 1 | 0 | 0 | | 0 |
| ..... | | | | | | | | | |
| AOAm | 0 | 0 | 0 | 0 | 0 | 0 | 1 | | 1 |
| F1 | 1 | 1 | 0 | 0 | 1 | 0 | 0 | | 0 |
| F2 | 0 | 0 | 0 | 1 | 0 | 1 | 0 | | 0 |
| ...... | | | | | | | | | |
| Fn | 0 | 0 | 1 | 0 | 0 | 0 | 0 | | 0 |
| IP1 | 0 | 0 | 0 | 0 | 0 | 0 | 1 | | 1 |
| IP2 | 1 | 1 | 0 | 0 | 1 | 0 | 0 | | 0 |
| ..... | | | | | | | | | |
| Ipo | 0 | 0 | 0 | 1 | 0 | 1 | 0 | | 0 |
| PRM | 0 | 0 | 1 | 1 | 0 | 1 | 0 | | 0 |
| PRM | 0 | 0 | 0 | 0 | 0 | 0 | 1 | | 1 |
| ..... | | | | | | | | | |
| PRM | 1 | 1 | 0 | 0 | 1 | 0 | 0 | | 0 |

$$C_{ii'}^{j} = x_i^j x_{i'}^j$$

$$C_{ii'} = \sum_{j=1}^{P} C_{ii'}^{j}$$

$$C_{1,2} = 4$$

$$C_{3,4} = 2$$

Annex 5a

| | I1 | I2 | I3 | I4 | I5 | I6 | I7 | ... | IN |
|---|---|---|---|---|---|---|---|---|---|
| AOA 1 | 0 | 0 | 1 | 1 | 0 | 1 | 0 | | 0 |
| AOA 2 | 1 | 1 | 0 | 0 | 1 | 0 | 0 | | 0 |
| ..... | | | | | | | | | |
| AOAm | 0 | 0 | 0 | 0 | 0 | 0 | 1 | | 1 |
| F1 | 1 | 1 | 0 | 0 | 1 | 0 | 0 | | 0 |
| F2 | 0 | 0 | 0 | 1 | 0 | 1 | 0 | | 0 |
| ...... | | | | | | | | | |
| Fn | 0 | 0 | 1 | 0 | 0 | 0 | 0 | | 0 |
| IP1 | 0 | 0 | 0 | 0 | 0 | 0 | 1 | | 1 |
| IP2 | 1 | 1 | 0 | 0 | 1 | 0 | 0 | | 0 |
| ..... | | | | | | | | | |
| Ipo | 0 | 0 | 0 | 1 | 0 | 1 | 0 | | 0 |
| PRM1 | 0 | 0 | 1 | 1 | 0 | 1 | 0 | | 0 |
| PRM2 | 0 | 0 | 0 | 0 | 0 | 0 | 1 | | 1 |
| ..... | | | | | | | | | |
| PRMp | 1 | 1 | 0 | 0 | 1 | 0 | 0 | | 0 |

$$C_i^{jj'} = x_i^j x_i^{j'}$$

$$C^{jj'} = \sum_{i=1}^{N} C_i^{jj'}$$

$$C^{AOA1,PRM1} = 3$$

$$C^{AOA2,F1} = 3$$

Annex 5b

| | I1 | I2 | I3 | I4 | I5 | I6 | I7 | I8 | I9 | I10 | I11 | I12 | I13 | I14 | I15 | I16 | I17 | I18 | I19 | I20 |
|---|---|---|---|---|---|---|---|---|---|---|---|---|---|---|---|---|---|---|---|---|
| F1 | 1 | 1 | 0 | 0 | 0 | 0 | 0 | 0 | 0 | 0 | 0 | 0 | 0 | 0 | 0 | 0 | 0 | 0 | 0 | 0 |
| F2 | 0 | 0 | 1 | 1 | 1 | 1 | 1 | 0 | 0 | 0 | 0 | 0 | 0 | 0 | 0 | 0 | 0 | 0 | 0 | 0 |
| F3 | 0 | 0 | 0 | 0 | 0 | 0 | 0 | 1 | 1 | 0 | 0 | 0 | 0 | 0 | 0 | 0 | 1 | 1 | 1 | 1 |
| F4 | 0 | 0 | 0 | 0 | 0 | 0 | 0 | 0 | 0 | 1 | 1 | 1 | 1 | 1 | 1 | 1 | 0 | 0 | 0 | 0 |
| DOA1 | 1 | 1 | 1 | 1 | 1 | 0 | 0 | 0 | 0 | 0 | 0 | 0 | 0 | 0 | 0 | 0 | 0 | 0 | 0 | 0 |
| DOA2 | 0 | 0 | 0 | 0 | 0 | 1 | 1 | 1 | 1 | 1 | 1 | 0 | 0 | 0 | 0 | 0 | 0 | 0 | 0 | 0 |
| DOA3 | 0 | 0 | 0 | 0 | 0 | 0 | 0 | 0 | 0 | 0 | 0 | 1 | 1 | 1 | 1 | 1 | 1 | 1 | 1 | 1 |
| PRM1 | 1 | 1 | 1 | 1 | 1 | 0 | 0 | 0 | 0 | 0 | 0 | 0 | 0 | 0 | 0 | 0 | 0 | 0 | 0 | 0 |
| PRM2 | 0 | 0 | 0 | 0 | 0 | 1 | 1 | 1 | 1 | 1 | 1 | 0 | 0 | 0 | 0 | 0 | 0 | 0 | 0 | 0 |
| PRM3 | 0 | 0 | 0 | 0 | 0 | 0 | 0 | 0 | 0 | 0 | 0 | 1 | 1 | 1 | 1 | 1 | 1 | 1 | 1 | 1 |

Annex 6a

| Criterion | | I1 | I2 | I3 | I4 | I5 | I6 | I7 | I8 | I9 | I10 | I11 | 12 | I13 | I14 | I15 | I16 | I17 | I18 | I19 | I20 | |
|---|---|---|---|---|---|---|---|---|---|---|---|---|---|---|---|---|---|---|---|---|---|---|
| 1076 | mode 1 | 1 | 1 | 1 | 1 | 1 | 0 | 0 | 0 | 0 | 0 | 0 | 0 | 0 | 0 | 0 | 0 | 0 | 0 | 0 | 0 | DOA1 |
| | mode 2 | 1 | 1 | 1 | 1 | 1 | 0 | 0 | 0 | 0 | 0 | 0 | 0 | 0 | 0 | 0 | 0 | 0 | 0 | 0 | 0 | PRM1 |
| | mode 3 | 1 | 1 | 0 | 0 | 0 | 0 | 0 | 0 | 0 | 0 | 0 | 0 | 0 | 0 | 0 | 0 | 0 | 0 | 0 | 0 | F1 |
| | mode 4 | 0 | 0 | 1 | 1 | 1 | 1 | 1 | 0 | 0 | 0 | 0 | 0 | 0 | 0 | 0 | 0 | 0 | 0 | 0 | 0 | F2 |
| | mode 5 | 0 | 0 | 0 | 0 | 0 | 1 | 1 | 1 | 1 | 1 | 1 | 0 | 0 | 0 | 0 | 0 | 0 | 0 | 0 | 0 | DOA2 |
| | mode 6 | 0 | 0 | 0 | 0 | 0 | 1 | 1 | 1 | 1 | 1 | 1 | 0 | 0 | 0 | 0 | 0 | 0 | 0 | 0 | 0 | PRM2 |
| | mode 7 | 0 | 0 | 0 | 0 | 0 | 0 | 0 | 1 | 1 | 0 | 0 | 0 | 0 | 0 | 0 | 0 | 1 | 1 | 1 | 1 | F3 |
| | mode 8 | 0 | 0 | 0 | 0 | 0 | 0 | 0 | 0 | 0 | 1 | 1 | 1 | 1 | 1 | 1 | 1 | 0 | 0 | 0 | 0 | F4 |
| | mode 9 | 0 | 0 | 0 | 0 | 0 | 0 | 0 | 0 | 0 | 0 | 0 | 1 | 1 | 1 | 1 | 1 | 1 | 1 | 1 | 1 | DOA3 |
| | mode 10 | 0 | 0 | 0 | 0 | 0 | 0 | 0 | 0 | 0 | 0 | 0 | 1 | 1 | 1 | 1 | 1 | 1 | 1 | 1 | 1 | PRM3 |

$Cl_3$ $Cl_2$ $Cl_1$

Annex 6b

| Criterion | | I1 | I2 | I3 | I4 | I5 | I6 | I7 | I8 | I9 | I10 | I11 | I12 | I13 | I14 | I15 | I16 | I17 | I18 | I19 | I20 | |
|---|---|---|---|---|---|---|---|---|---|---|---|---|---|---|---|---|---|---|---|---|---|---|
| 912 | mode 1 | 1 | 1 | 1 | 1 | 1 | 0 | 0 | 0 | 0 | 0 | 0 | 0 | 0 | 0 | 0 | 0 | 0 | 0 | 0 | 0 | DOA1 |
| | mode 2 | 1 | 1 | 1 | 1 | 1 | 0 | 0 | 0 | 0 | 0 | 0 | 0 | 0 | 0 | 0 | 0 | 0 | 0 | 0 | 0 | PRM1 |
| | mode 3 | 1 | 1 | 0 | 0 | 0 | 0 | 0 | 0 | 0 | 0 | 0 | 0 | 0 | 0 | 0 | 0 | 0 | 0 | 0 | 0 | F1 |
| | mode 4 | 0 | 0 | 1 | 1 | 1 | 1 | 1 | 0 | 0 | 0 | 0 | 0 | 0 | 0 | 0 | 0 | 0 | 0 | 0 | 0 | F2 |
| | mode 5 | 0 | 0 | 0 | 0 | 0 | 1 | 1 | 1 | 1 | 1 | 1 | 0 | 0 | 0 | 0 | 0 | 0 | 0 | 0 | 0 | DOA2 |
| | mode 6 | 0 | 0 | 0 | 0 | 0 | 1 | 1 | 1 | 1 | 1 | 1 | 0 | 0 | 0 | 0 | 0 | 0 | 0 | 0 | 0 | PRM2 |
| | mode 7 | 0 | 0 | 0 | 0 | 0 | 0 | 0 | 1 | 1 | 0 | 0 | 0 | 0 | 0 | 0 | 0 | 1 | 1 | 1 | 1 | F3 |
| | mode 8 | 0 | 0 | 0 | 0 | 0 | 0 | 0 | 0 | 0 | 1 | 1 | 1 | 1 | 1 | 1 | 1 | 0 | 0 | 0 | 0 | F4 |
| | mode 9 | 0 | 0 | 0 | 0 | 0 | 0 | 0 | 0 | 0 | 0 | 0 | 1 | 1 | 1 | 1 | 1 | 1 | 1 | 1 | 1 | DOA3 |
| | mode 10 | 0 | 0 | 0 | 0 | 0 | 0 | 0 | 0 | 0 | 0 | 0 | 1 | 1 | 1 | 1 | 1 | 1 | 1 | 1 | 1 | PRM3 |

$Cl_{15}$ $Cl_{14}$ $Cl_{13}$ $Cl_{12}$ $cl_{11}$

Annex 6c

| | I1 | I2 | I3 | I4 | I5 | I6 | I7 | I8 | I9 | I10 | I11 | I12 | I13 | I14 | I15 | I16 | I17 | I18 | I19 | I20 | |
|---|---|---|---|---|---|---|---|---|---|---|---|---|---|---|---|---|---|---|---|---|---|
| Mode 1 | 1 | 1 | 1 | 1 | 1 | 0 | 0 | 0 | 0 | 0 | 0 | 0 | 0 | 0 | 0 | 0 | 0 | 0 | 0 | 0 | DOA1 |
| Mode 2 | 1 | 1 | 1 | 1 | 1 | 0 | 0 | 0 | 0 | 0 | 0 | 0 | 0 | 0 | 0 | 0 | 0 | 0 | 0 | 0 | PRM1 |
| Mode 3 | 1 | 1 | 0 | 0 | 0 | 0 | 0 | 0 | 0 | 0 | 0 | 0 | 0 | 0 | 0 | 0 | 0 | 0 | 0 | 0 | F1 |
| Mode 4 | 0 | 0 | 1 | 1 | 1 | 1 | 1 | 0 | 0 | 0 | 0 | 0 | 0 | 0 | 0 | 0 | 0 | 0 | 0 | 0 | F2 |
| Mode 5 | 0 | 0 | 0 | 0 | 0 | 1 | 1 | 1 | 1 | 1 | 1 | 0 | 0 | 0 | 0 | 0 | 0 | 0 | 0 | 0 | DOA2 |
| Mode 6 | 0 | 0 | 0 | 0 | 0 | 1 | 1 | 1 | 1 | 1 | 1 | 0 | 0 | 0 | 0 | 0 | 0 | 0 | 0 | 0 | PRM2 |
| Mode 7 | 0 | 0 | 0 | 0 | 0 | 0 | 0 | 1 | 1 | 0 | 0 | 0 | 0 | 0 | 0 | 0 | 1 | 1 | 1 | 1 | F3 |
| Mode 8 | 0 | 0 | 0 | 0 | 0 | 0 | 0 | 0 | 0 | 1 | 1 | 1 | 1 | 1 | 1 | 1 | 0 | 0 | 0 | 0 | F4 |
| Mode 9 | 0 | 0 | 0 | 0 | 0 | 0 | 0 | 0 | 0 | 0 | 0 | 1 | 1 | 1 | 1 | 1 | 1 | 1 | 1 | 1 | DOA3 |
| Mode 10 | 0 | 0 | 0 | 0 | 0 | 0 | 0 | 0 | 0 | 0 | 0 | 1 | 1 | 1 | 1 | 1 | 1 | 1 | 1 | 1 | PRM3 |

Annex 7

Criterion

203

| | I1 | I2 | I3 | I4 | I5 | I6 | I7 | I8 | I9 | I10 | I11 | I12 | I13 | I14 | I15 | I16 | I17 | I18 | I19 | I20 | |
|---|---|---|---|---|---|---|---|---|---|---|---|---|---|---|---|---|---|---|---|---|---|
| mode 1 | 1 | 1 | 1 | 1 | 1 | 0 | 0 | 0 | 0 | 0 | 0 | 0 | 0 | 0 | 0 | 0 | 0 | 0 | 0 | 0 | DOA1 |
| mode 2 | 1 | 1 | 1 | 1 | 1 | 0 | 0 | 0 | 0 | 0 | 0 | 0 | 0 | 0 | 0 | 0 | 0 | 0 | 0 | 0 | PRM1 |
| mode 3 | 1 | 1 | 0 | 0 | 0 | 0 | 0 | 0 | 0 | 0 | 0 | 0 | 0 | 0 | 0 | 0 | 0 | 0 | 0 | 0 | F1 |
| mode 4 | 0 | 0 | 1 | 1 | 1 | 1 | 1 | 0 | 0 | 0 | 0 | 0 | 0 | 0 | 0 | 0 | 0 | 0 | 0 | 0 | F2 |
| mode 5 | 0 | 0 | 0 | 0 | 0 | 1 | 1 | 1 | 1 | 1 | 1 | 0 | 0 | 0 | 0 | 0 | 0 | 0 | 0 | 0 | DOA2 |
| mode 6 | 0 | 0 | 0 | 0 | 0 | 1 | 1 | 1 | 1 | 1 | 1 | 0 | 0 | 0 | 0 | 0 | 0 | 0 | 0 | 0 | PRM2 |
| mode 7 | 0 | 0 | 0 | 0 | 0 | 0 | 0 | 1 | 1 | 0 | 0 | 0 | 0 | 0 | 0 | 0 | 1 | 1 | 1 | 1 | F3 |
| mode 8 | 0 | 0 | 0 | 0 | 0 | 0 | 0 | 0 | 0 | 1 | 1 | 1 | 1 | 1 | 1 | 1 | 0 | 0 | 0 | 0 | F4 |
| mode 9 | 0 | 0 | 0 | 0 | 0 | 0 | 0 | 0 | 0 | 0 | 0 | 1 | 1 | 1 | 1 | 1 | 1 | 1 | 1 | 1 | DOA3 |
| mode 10 | 0 | 0 | 0 | 0 | 0 | 0 | 0 | 0 | 0 | 0 | 0 | 1 | 1 | 1 | 1 | 1 | 1 | 1 | 1 | 1 | PRM3 |

Annex 8

Criterion

303

$C_{1'} = C_1$ $F_{4'} = F_4 - C_1$

| | i10 | i11 | i12 | i13 | i14 | i15 | i16 | i17 | i18 | i19 | i20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 0 | 0 | 0 | 0 | 0 | 0 | 0 | 1 | 1 | 1 | 1 | F3 |
| mode 8 | 1 | 1 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

263

$C_{1'} = C_1 - F_4$ $F_{4'} = F_4 - C_1$ $C_{x'} = C_1 \cap F_4$

| | i10 | i11 | i12 | i13 | i14 | i15 | i16 | i17 | i18 | i19 | i20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 0 | 0 | 0 | 0 | 0 | 0 | 0 | 1 | 1 | 1 | 1 | F3 |
| mode 8 | 1 | 1 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

243

$C_{1'} = C_1 - F_4$ $F_{4'} = F_4$

| | i10 | i11 | i12 | i13 | i14 | i15 | i16 | i17 | i18 | i19 | i20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 0 | 0 | 0 | 0 | 0 | 0 | 0 | 1 | 1 | 1 | 1 | F3 |
| mode 8 | 1 | 1 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

235

$C_{1'} = C_1 \cup F_4$

| | i10 | i11 | i12 | i13 | i14 | i15 | i16 | i17 | i18 | i19 | i20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 0 | 0 | 0 | 0 | 0 | 0 | 0 | 1 | 1 | 1 | 1 | F3 |
| mode 8 | 1 | 1 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Annex 9

Criterion

307

$C_{I'} = C_1$ $F_{3'} = F_3 - C_1$

| | I8 | I9 | I12 | I13 | I14 | I15 | I16 | I17 | I18 | I19 | I20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 1 | 1 | 0 | 0 | 0 | 0 | 0 | 1 | 1 | 1 | 1 | F3 |
| mode 8 | 0 | 0 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

251

$C_{I'} = C_1 - F_3$ $F_{3'} = F_3$

| | I8 | I9 | I12 | I13 | I14 | I15 | I16 | I17 | I18 | I19 | I20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 1 | 1 | 0 | 0 | 0 | 0 | 0 | 1 | 1 | 1 | 1 | F3 |
| mode 8 | 0 | 0 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

267

$C_{I'} = C_1 - F_3$ $F_{3'} = F_3 - C_1$ $C_{x'} = C_1 \cap F_3$

| | I8 | I9 | I12 | I13 | I14 | I15 | I16 | I17 | I18 | I19 | I20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 1 | 1 | 0 | 0 | 0 | 0 | 0 | 1 | 1 | 1 | 1 | F3 |
| mode 8 | 0 | 0 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Criterion

231

$C_{I'} = C_1 \cup F_3$

| | I8 | I9 | I12 | I13 | I14 | I15 | I16 | I17 | I18 | I19 | I20 | |
|---|---|---|---|---|---|---|---|---|---|---|---|---|
| mode 1 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | F2 |
| mode 5 | 1 | 1 | 0 | 0 | 0 | 0 | 0 | 0 | 0 | 0 | 0 | DOA2 |
| mode 6 | 1 | 1 | 0 | 0 | 0 | 0 | 0 | 0 | 0 | 0 | 0 | PRM2 |
| mode 7 | 1 | 1 | 0 | 0 | 0 | 0 | 0 | 1 | 1 | 1 | 1 | F3 |
| mode 8 | 0 | 0 | 1 | 1 | 1 | 1 | 1 | 0 | 0 | 0 | 0 | F4 |
| mode 9 | 0 | 0 | 1 | 1 | 1 | 1 | 1 | 1 | 1 | 1 | 1 | DOA3 |
| mode 10 | 0 | 0 | 1 | 1 | 1 | 1 | 1 | 1 | 1 | 1 | 1 | PRM3 |

Annex 10a

Criterion

| | I8 | I9 | I10 | I11 | I12 | I13 | I14 | I15 | I16 | I17 | I18 | I19 | I20 | |
|---|---|---|---|---|---|---|---|---|---|---|---|---|---|---|
| mode 1 | 0 | 0 | 0 | 0 | 0 | 0 | 0 | 0 | 0 | 0 | 0 | 0 | 0 | DOA1 |
| mode 2 | 0 | 0 | 0 | 0 | 0 | 0 | 0 | 0 | 0 | 0 | 0 | 0 | 0 | PRM1 |
| mode 3 | 0 | 0 | 0 | 0 | 0 | 0 | 0 | 0 | 0 | 0 | 0 | 0 | 0 | F1 |
| mode 4 | 0 | 0 | 0 | 0 | 0 | 0 | 0 | 0 | 0 | 0 | 0 | 0 | 0 | F2 |
| mode 5 | 1 | 1 | 1 | 1 | 0 | 0 | 0 | 0 | 0 | 0 | 0 | 0 | 0 | DOA2 |
| mode 6 | 1 | 1 | 1 | 1 | 0 | 0 | 0 | 0 | 0 | 0 | 0 | 0 | 0 | PRM2 |
| mode 7 | 1 | 1 | 0 | 0 | 0 | 0 | 0 | 0 | 0 | 1 | 1 | 1 | 1 | F3 |
| mode 8 | 0 | 0 | 1 | 1 | 1 | 1 | 1 | 1 | 1 | 0 | 0 | 0 | 0 | F4 |
| mode 9 | 0 | 0 | 0 | 0 | 1 | 1 | 1 | 1 | 1 | 1 | 1 | 1 | 1 | DOA3 |
| mode 10 | 0 | 0 | 0 | 0 | 1 | 1 | 1 | 1 | 1 | 1 | 1 | 1 | 1 | PRM3 |

$C_3 = \{I_8, I_9\}$ $C_2 = \{I_{10}, I_{11}\}$ $C_1 = \{I_{12}, I_{13}, I_{14}, I_{15}, I_{16}, I_{17}, I_{18}, I_{19}, I_{20}\}$

Annex 10b

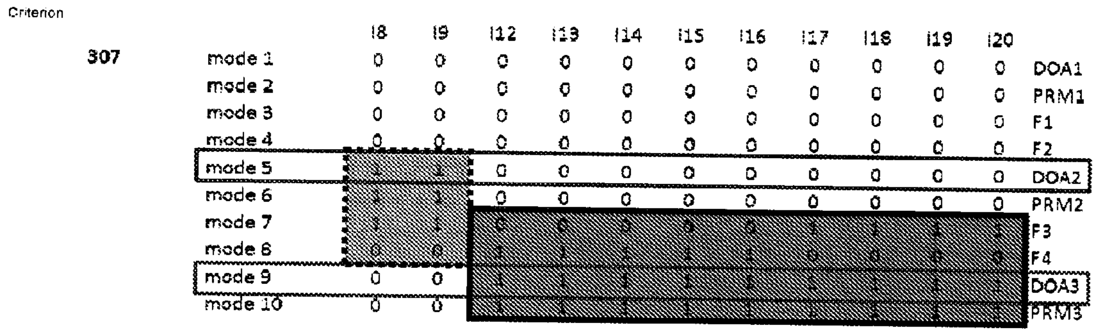
Annex 11
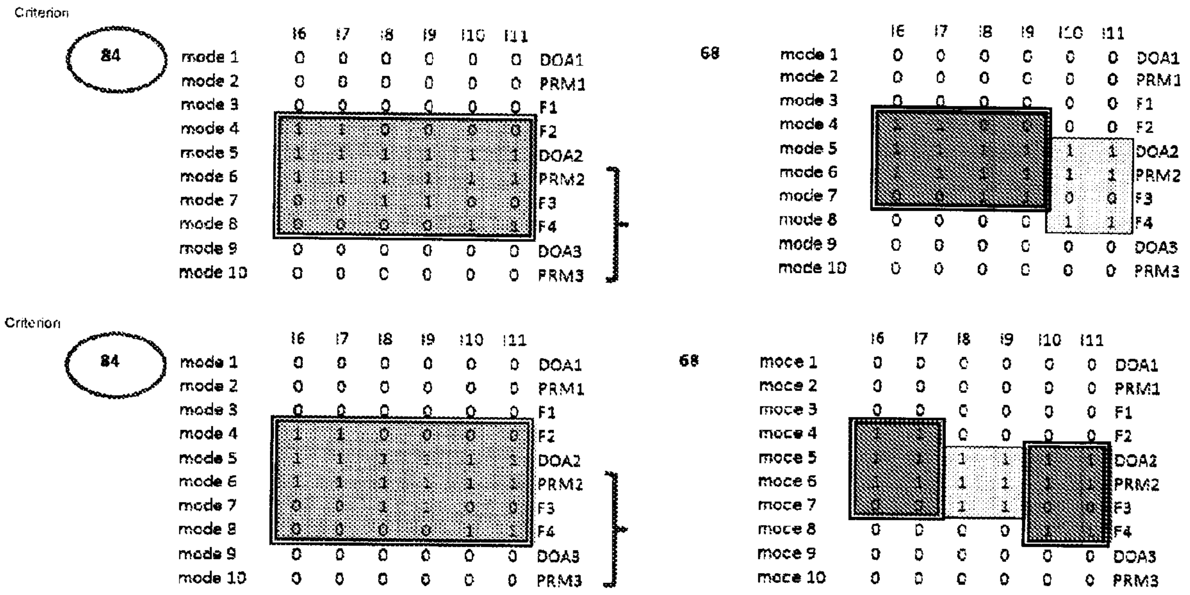
Annex 12a
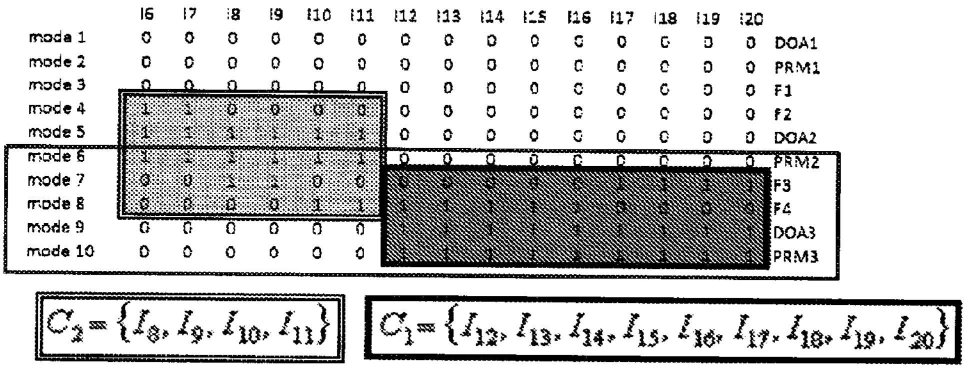
Annex 12b

Criterion

207

$C_{2'} = C_2$ $F_{2'} = F_2 - C_2$

| | I3 | I4 | I5 | I6 | I7 | 8 | I9 | I10 | I11 | |
|---|---|---|---|---|---|---|---|---|---|---|
| mode 1 | 1 | 1 | 1 | 0 | 0 | 0 | 0 | 0 | 0 | DOA1 |
| mode 2 | 1 | 1 | 1 | 0 | 0 | 0 | 0 | 0 | 0 | PRM1 |
| mode 3 | 0 | 0 | 0 | 0 | 0 | 0 | 0 | 0 | 0 | F1 |
| mode 4 | 1 | 1 | 1 | 1 | 1 | 0 | 0 | 0 | 0 | F2 |
| mode 5 | 0 | 0 | 0 | 1 | 1 | 1 | 1 | 1 | 1 | DOA2 |
| mode 6 | 0 | 0 | 0 | 1 | 1 | 1 | 1 | 1 | 1 | PRM2 |
| mode 7 | 0 | 0 | 0 | 0 | 0 | 1 | 1 | 0 | 0 | F3 |
| mode 8 | 0 | 0 | 0 | 0 | 0 | 0 | 0 | 1 | 1 | F4 |
| mode 9 | 0 | 0 | 0 | 0 | 0 | 0 | 0 | 0 | 0 | DOA3 |
| mode 10 | 0 | 0 | 0 | 0 | 0 | 0 | 0 | 0 | 0 | PRM3 |

Criterion

179

$C_{2'} = C_2 - F_2$ $F_{2'} = F_2$

| | I3 | I4 | I5 | I6 | I7 | I8 | I9 | I10 | I11 | |
|---|---|---|---|---|---|---|---|---|---|---|
| mode 1 | 1 | 1 | 1 | 0 | 0 | 0 | 0 | 0 | 0 | DOA1 |
| mode 2 | 1 | 1 | 1 | 0 | 0 | 0 | 0 | 0 | 0 | PRM1 |
| mode 3 | 0 | 0 | 0 | 0 | 0 | 0 | 0 | 0 | 0 | F1 |
| mode 4 | 1 | 1 | 1 | 1 | 1 | 0 | 0 | 0 | 0 | F2 |
| mode 5 | 0 | 0 | 0 | 1 | 1 | 1 | 1 | 1 | 1 | DOA2 |
| mode 6 | 0 | 0 | 0 | 1 | 1 | 1 | 1 | 1 | 1 | PRM2 |
| mode 7 | 0 | 0 | 0 | 0 | 0 | 1 | 1 | 0 | 0 | F3 |
| mode 8 | 0 | 0 | 0 | 0 | 0 | 0 | 0 | 1 | 1 | F4 |
| mode 9 | 0 | 0 | 0 | 0 | 0 | 0 | 0 | 0 | 0 | DOA3 |
| mode 10 | 0 | 0 | 0 | 0 | 0 | 0 | 0 | 0 | 0 | PRM3 |

Criterion

123

$C_{2'} = C_2 \cup F_2$

| | I3 | I4 | I5 | I6 | I7 | I8 | I9 | I10 | I11 | |
|---|---|---|---|---|---|---|---|---|---|---|
| mode 1 | 1 | 1 | 1 | 0 | 0 | 0 | 0 | 0 | 0 | DOA1 |
| mode 2 | 1 | 1 | 1 | 0 | 0 | 0 | 0 | 0 | 0 | PRM1 |
| mode 3 | 0 | 0 | 0 | 0 | 0 | 0 | 0 | 0 | 0 | F1 |
| mode 4 | 1 | 1 | 1 | 1 | 1 | 0 | 0 | 0 | 0 | F2 |
| mode 5 | 0 | 0 | 0 | 1 | 1 | 1 | 1 | 1 | 1 | DOA2 |
| mode 6 | 0 | 0 | 0 | 1 | 1 | 1 | 1 | 1 | 1 | PRM2 |
| mode 7 | 0 | 0 | 0 | 0 | 0 | 1 | 1 | 0 | 0 | F3 |
| mode 8 | 0 | 0 | 0 | 0 | 0 | 0 | 0 | 1 | 1 | F4 |
| mode 9 | 0 | 0 | 0 | 0 | 0 | 0 | 0 | 0 | 0 | DOA3 |
| mode 10 | 0 | 0 | 0 | 0 | 0 | 0 | 0 | 0 | 0 | PRM3 |

Criterion

191

$C_{2'} = C_2 - F_2$ $C_{x'} = C_2 \cap F_2$ $F_{2'} = F_2 - C_2$

| | I3 | I4 | I5 | I6 | I7 | I8 | I9 | I10 | I11 | |
|---|---|---|---|---|---|---|---|---|---|---|
| mode 1 | 1 | 1 | 1 | 0 | 0 | 0 | 0 | 0 | 0 | DOA1 |
| mode 2 | 1 | 1 | 1 | 0 | 0 | 0 | 0 | 0 | 0 | PRM1 |
| mode 3 | 0 | 0 | 0 | 0 | 0 | 0 | 0 | 0 | 0 | F1 |
| mode 4 | 1 | 1 | 1 | 1 | 1 | 0 | 0 | 0 | 0 | F2 |
| mode 5 | 0 | 0 | 0 | 1 | 1 | 1 | 1 | 1 | 1 | DOA2 |
| mode 6 | 0 | 0 | 0 | 1 | 1 | 1 | 1 | 1 | 1 | PRM2 |
| mode 7 | 0 | 0 | 0 | 0 | 0 | 1 | 1 | 0 | 0 | F3 |
| mode 8 | 0 | 0 | 0 | 0 | 0 | 0 | 0 | 1 | 1 | F4 |
| mode 9 | 0 | 0 | 0 | 0 | 0 | 0 | 0 | 0 | 0 | DOA3 |
| mode 10 | 0 | 0 | 0 | 0 | 0 | 0 | 0 | 0 | 0 | PRM3 |

Annex 13

| Criterion | | I1 | I2 | I3 | I4 | I5 | |
|---|---|---|---|---|---|---|---|
| 63 | mode 1 | 1 | 1 | 1 | 1 | 1 | DOA1 |
| | mode 2 | 1 | 1 | 1 | 1 | 1 | PRM1 |
| | mode 3 | 1 | 1 | 0 | 0 | 0 | F1 |
| | mode 4 | 0 | 0 | 1 | 1 | 1 | F2 |
| | mode 5 | 0 | 0 | 0 | 0 | 0 | DOA2 |
| | mode 6 | 0 | 0 | 0 | 0 | 0 | PRM2 |
| | mode 7 | 0 | 0 | 0 | 0 | 0 | F3 |
| | mode 8 | 0 | 0 | 0 | 0 | 0 | F4 |
| | mode 9 | 0 | 0 | 0 | 0 | 0 | DOA3 |
| | mode 10 | 0 | 0 | 0 | 0 | 0 | PRM3 |

| Criterion | | I1 | I2 | I3 | I4 | I5 | |
|---|---|---|---|---|---|---|---|
| 51 | mode 1 | 1 | 1 | 1 | 1 | 1 | DOA1 |
| | mode 2 | 1 | 1 | 1 | 1 | 1 | PRM1 |
| | mode 3 | 1 | 1 | 0 | 0 | 0 | F1 |
| | mode 4 | 0 | 0 | 1 | 1 | 1 | F2 |
| | mode 5 | 0 | 0 | 0 | 0 | 0 | DOA2 |
| | mode 6 | 0 | 0 | 0 | 0 | 0 | PRM2 |
| | mode 7 | 0 | 0 | 0 | 0 | 0 | F3 |
| | mode 8 | 0 | 0 | 0 | 0 | 0 | F4 |
| | mode 9 | 0 | 0 | 0 | 0 | 0 | DOA3 |
| | mode 10 | 0 | 0 | 0 | 0 | 0 | PRM3 |

Annex 14

| Criterion | | I1 | I2 | I3 | I4 | I5 | I6 | I7 | I8 | I9 | I10 | I11 | I12 | I13 | I14 | I15 | I16 | I17 | I18 | I19 | I20 | |
|---|---|---|---|---|---|---|---|---|---|---|---|---|---|---|---|---|---|---|---|---|---|---|
| 1076 | mode 1 | 1 | 1 | 1 | 1 | 1 | 0 | 0 | 0 | 0 | 0 | 0 | 0 | 0 | 0 | 0 | 0 | 0 | 0 | 0 | 0 | DOA1 |
| | mode 2 | 1 | 1 | 1 | 1 | 1 | 0 | 0 | 0 | 0 | 0 | 0 | 0 | 0 | 0 | 0 | 0 | 0 | 0 | 0 | 0 | PRM1 |
| | mode 3 | 1 | 1 | 0 | 0 | 0 | 0 | 0 | 0 | 0 | 0 | 0 | 0 | 0 | 0 | 0 | 0 | 0 | 0 | 0 | 0 | F1 |
| | mode 4 | 0 | 0 | 1 | 1 | 1 | 1 | 1 | 0 | 0 | 0 | 0 | 0 | 0 | 0 | 0 | 0 | 0 | 0 | 0 | 0 | F2 |
| | mode 5 | 0 | 0 | 0 | 0 | 0 | 1 | 1 | 1 | 1 | 1 | 1 | 0 | 0 | 0 | 0 | 0 | 0 | 0 | 0 | 0 | DOA2 |
| | mode 6 | 0 | 0 | 0 | 0 | 0 | 1 | 1 | 1 | 1 | 1 | 1 | 0 | 0 | 0 | 0 | 0 | 0 | 0 | 0 | 0 | PRM2 |
| | mode 7 | 0 | 0 | 0 | 0 | 0 | 0 | 0 | 1 | 1 | 0 | 0 | 0 | 0 | 0 | 0 | 0 | 1 | 1 | 1 | [illegible] | F3 |
| | mode 8 | 0 | 0 | 0 | 0 | 0 | 0 | 1 | 0 | 0 | 1 | 1 | 1 | 1 | 1 | 1 | 1 | 0 | 0 | 0 | [illegible] | F4 |
| | mode 9 | 0 | 0 | 0 | 0 | 0 | 0 | 0 | 0 | 0 | 0 | 0 | 1 | 1 | 1 | 1 | 1 | 1 | 1 | 1 | [illegible] | DOA3 |
| | mode 10 | 0 | 0 | 0 | 0 | 0 | 0 | 0 | 0 | 0 | 0 | 0 | 1 | 1 | 1 | 1 | 1 | 1 | 1 | 1 | [illegible] | PRM3 |

$C_3$ $C_2$ $C_1$

Annex 15

| | I1 | I2 | I3 | I4 | I5 | I6 | I7 | ... | IN |
|---|---|---|---|---|---|---|---|---|---|
| AOA 1 | 0 | 0 | 1 | 1 | 0 | 1 | 0 | | 0 |
| AOA 2 | 1 | 1 | 0 | 0 | 1 | 0 | 0 | | 0 |
| ..... | | | | | | | | | |
| AOAm | 0 | 0 | 0 | 0 | 0 | 0 | 1 | | 1 |
| F1 | 1 | 1 | 0 | 0 | 1 | 0 | 0 | | 0 |
| F2 | 0 | 0 | 0 | 1 | 0 | 1 | 0 | | 0 |
| ...... | | | | | | | | | |
| Fn | 0 | 0 | 1 | 0 | 0 | 0 | 0 | | 0 |
| IP1 | 0 | 0 | 0 | 0 | 0 | 0 | 1 | | 1 |
| IP2 | 1 | 1 | 0 | 0 | 1 | 0 | 0 | | 0 |
| ..... | | | | | | | | | |
| Ipo | 0 | 0 | 0 | 1 | 0 | 1 | 0 | | 0 |
| PRM1 | 0 | 0 | 1 | 1 | 0 | 1 | 0 | | 0 |
| PRM2 | 0 | 0 | 0 | 0 | 0 | 0 | 1 | | 1 |
| ..... | | | | | | | | | |
| PRMp | 1 | 1 | 0 | 0 | 1 | 0 | 0 | | 0 |

Annex 16

| | I1 | I2 | I3 | I4 | I5 | I6 | I7 | ... | IN |
|---|---|---|---|---|---|---|---|---|---|
| I1 | 1 | 1 | 0 | 0 | 1 | 0 | 0 | | 0 |
| I2 | | 1 | 0 | 0 | 1 | 0 | 0 | | 0 |
| I3 | | | 1 | 0,4 | 0 | 0,4 | 0 | | 0 |
| I4 | | | | 1 | 0 | 1 | 0 | | 0 |
| I5 | | | | | 1 | 0 | 0 | | 0 |
| I6 | | | | | | 1 | 0 | | |
| I7 | | | | | | | 1 | | 1 |
| ... | | | | | | | | | |
| IN | | | | | | | | | 1 |

Annex 17

| | I3 | I4 | I6 | I1 | I2 | I5 | I7 | IN | ... |
|---|---|---|---|---|---|---|---|---|---|
| AOA 1 | 1 | 1 | 1 | 0 | 0 | 0 | 0 | 0 | |
| AOA 2 | 0 | 0 | 0 | 1 | 1 | 1 | 0 | 0 | |
| ..... | | | | | | | | | |
| AOAm | 0 | 0 | 0 | 0 | 0 | 0 | 1 | 1 | |
| F1 | 0 | 0 | 0 | 1 | 1 | 1 | 0 | 0 | |
| F2 | 0 | 1 | 1 | 0 | 0 | 0 | 0 | 0 | |
| ...... | | | | | | | | | |
| Fn | 1 | 0 | 0 | 0 | 0 | 0 | 0 | 0 | |
| IP1 | 0 | 0 | 0 | 0 | 0 | 0 | 1 | 1 | |
| IP2 | 0 | 0 | 0 | 1 | 1 | 1 | 0 | 0 | |
| ..... | | | | | | | | | |
| Ipo | 0 | 1 | 1 | 0 | 0 | 0 | 0 | 0 | |
| PRM1 | 1 | 1 | 1 | 0 | 0 | 0 | 0 | 0 | |
| PRM2 | 0 | 0 | 0 | 0 | 0 | 0 | 1 | 1 | |
| ..... | | | | | | | | | |
| PRMp | 0 | 0 | 0 | 1 | 1 | 1 | 0 | 0 | |

Annex 18

| | AOA1 | AOA2 | AOAm | F1 | F2 | FN | IP1 | IP2 | IPO | PRM1 | PRM2 | PRMP |
|---|---|---|---|---|---|---|---|---|---|---|---|---|
| AOA 1 | 1 | 0 | 0 | 0 | 0,66 | 0,33 | 0 | 0 | 0,66 | 1 | 0 | 0 |
| AOA 2 | | 1 | 0 | 1 | 0 | 0 | 0 | 1 | 0 | 0 | 0 | 1 |
| AOAm | | | 1 | 0 | 0 | 0 | 1 | 0 | 0 | 0 | 1 | 0 |
| F1 | | | | 1 | 0 | 0 | 0 | 1 | 0 | 0 | 0 | 1 |
| F2 | | | | | 1 | 0 | 0 | 1 | 0 | 0,66 | 0 | 0 |
| Fn | | | | | | 1 | 0 | 0 | 0 | 0,33 | 0 | 0 |
| IP1 | | | | | | | 1 | 0 | 0 | 0 | 1 | 0 |
| IP2 | | | | | | | | 1 | 0 | 0 | 0 | 1 |
| Ipo | | | | | | | | | 1 | 1 | 0 | 0 |
| PRM1 | | | | | | | | | | 1 | 0 | 0 |
| PRM2 | | | | | | | | | | | 1 | 0 |
| PRMp | | | | | | | | | | | | 1 |

Annex 19

$Cl_1$

| | I3 | I4 | I6 | I1 | I2 | I5 | I7 | IN |
|---|---|---|---|---|---|---|---|---|
| AOA 1 | 1 | 1 | 1 | 0 | 0 | 0 | 0 | 0 |
| PRM1 | 1 | 1 | 1 | 0 | 0 | 0 | 0 | 0 |
| F2 | 0 | 1 | 1 | 0 | 0 | 0 | 0 | 0 |
| Ipo | 0 | 1 | 1 | 0 | 0 | 0 | 0 | 0 |
| Fn | 1 | 0 | 0 | 0 | 0 | 0 | 0 | 0 |
| AOA 2 | 0 | 0 | 0 | 1 | 1 | 1 | 0 | 0 |
| F1 | 0 | 0 | 0 | 1 | 1 | 1 | 0 | 0 |
| IP2 | 0 | 0 | 0 | 1 | 1 | 1 | 0 | 0 |
| PRMp | 0 | 0 | 0 | 1 | 1 | 1 | 0 | 0 |
| AOAm | 0 | 0 | 0 | 0 | 0 | 0 | 1 | 1 |
| IP1 | 0 | 0 | 0 | 0 | 0 | 0 | 1 | 1 |
| PRM2 | 0 | 0 | 0 | 0 | 0 | 0 | 1 | 1 |

$Cl_2$ $Cl_3$

Annex 20

The invention claimed is:

1. A method of non-supervised deinterleaving of pulse trains, comprising:

constructing, by a processor, for each of one or more parameters, N histograms that define groups of pulses per parameter or group of parameters, N being an integer greater than 1, said histograms being representative of the pulse trains;

extracting, by a processor, modes on the basis of said histograms;

constructing, by a processor, groups of interest on the basis of said extracted modes;

labeling, by a processor, the pulses with their membership in at least one group of interest; and non-supervised cross-classing, by a processor, of the modes so as to reorganize the labeled pulses by similarity.

2. The method of claim 1, further comprising:

thresholding the histograms;

decomposing the histograms into modes; and characterizing the modes.

3. The method of claim 1, wherein the cross-classing of the modes comprises progressively creating at least one class of homogeneous pulses-modes, the method further comprising:

on initialization of a search for the mode having a maximum of interest, this mode forming a first class, and then, for each remaining mode:

searching, among the remaining modes, for the mode having the largest cardinal of intersection with the current class;

searching for the partition of the mode found, making it possible to maximize a criterion of grouping with the current class or classes; and merging the mode with the current class or classes.

4. The method of claim 1, wherein the cross-classing comprises:

classifying the pulses as a function of their mutual correlation relationships;

classifying the modes as a function of their mutual correlation relationships; and grouping the modes and pulses into classes.

* * * * *